(12) United States Patent  
Murata et al.

(10) Patent No.: US 7,956,916 B2  
(45) Date of Patent: Jun. 7, 2011

(54) SOLID-STATE IMAGING DEVICE

(75) Inventors: Takahiko Murata, Osaka (JP); Yoshihisa Kato, Shiga (JP); Shigetaka Kasuga, Osaka (JP); Takayoshi Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 394 days.

(21) Appl. No.: 12/195,584

(22) Filed: Aug. 21, 2008

(65) Prior Publication Data

US 2009/0059047 A1 Mar. 5, 2009

(30) Foreign Application Priority Data

Aug. 31, 2007 (JP) ................................. 2007-226663

(51) Int. Cl.  
*H04N 5/335* (2006.01)
(52) U.S. Cl. ...................................................... 348/308
(58) Field of Classification Search .................. 348/308; 257/291, 292, 293, 294; 250/208.1  
See application file for complete search history.

(56) References Cited

U.S. PATENT DOCUMENTS

| 2006/0102827 A1 | 5/2006 | Kasuga et al. |
| 2006/0119720 A1 | 6/2006 | Hong |
| 2006/0278948 A1 | 12/2006 | Yamaguchi et al. |
| 2007/0013797 A1* | 1/2007 | McKee .......................... 348/308 |
| 2007/0103569 A1 | 5/2007 | Kawahito |
| 2007/0131991 A1* | 6/2007 | Sugawa ......................... 257/292 |
| 2007/0153109 A1* | 7/2007 | Lule .............................. 348/308 |
| 2007/0222867 A1 | 9/2007 | Murata et al. |
| 2008/0061216 A1 | 3/2008 | Kasuga et al. |
| 2008/0129851 A1 | 6/2008 | Kasuga et al. |

FOREIGN PATENT DOCUMENTS

| JP | 2004-363666 | 12/2004 |
| WO | 2004/110057 | 12/2004 |

OTHER PUBLICATIONS

English language Abstract JP 2004-363666 A.

* cited by examiner

*Primary Examiner* — Jason Whipkey  
(74) *Attorney, Agent, or Firm* — Greenblum & Bernstein, P.L.C.

(57) ABSTRACT

Provided is a solid-state imaging device having pixel units that are two-dimensionally arranged, and including: a photodiode that generates an optical signal charge corresponding to an intensity and an exposure time of light; a MOS transistor that transfers the optical signal charge; an accumulating unit that generates a voltage corresponding to the signal charge through the MOS transistor; a storing unit that stores a voltage corresponding to an optical signal charge in the accumulating unit; and a voltage setting unit that sets a value of a voltage in the accumulating unit to a value corresponding to the voltage in the storing unit.

15 Claims, 22 Drawing Sheets

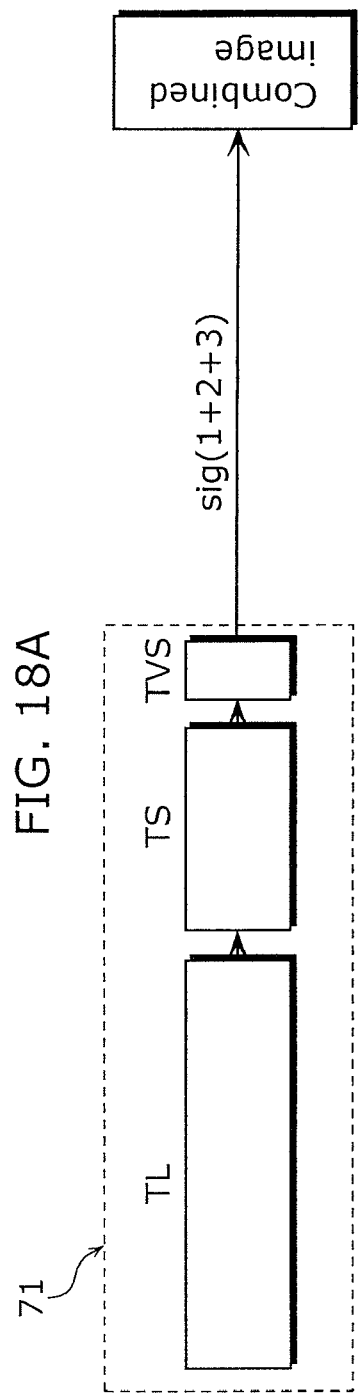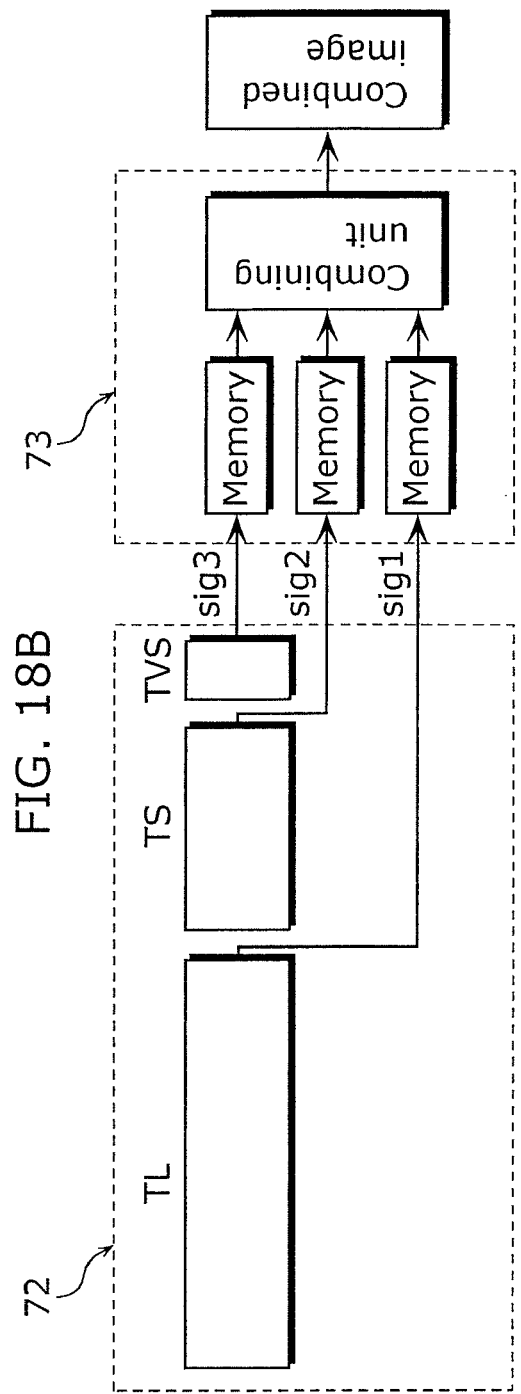

the signal voltage corresponding to the optical signal charge in the charge combining unit to a value corresponding to the signal voltage stored by the storing unit.

SOLID-STATE IMAGING DEVICE

BACKGROUND OF THE INVENTION (1) Field of the Invention

The present invention relates to a solid-state imaging device, and more particularly to a solid-state imaging device to be applied to a digital camera.

(2) Description of the Related Art

Conventionally, a dynamic range of solid-state imaging devices has been approximately between 60 dB and 80 dB. The dynamic range is desired to be from 100 dB to 120 dB that is equivalent to visibility of the naked eye or a dynamic range of a silver salt film, or is desired to be improved to a much higher range for use in high-performance cameras, such as a vehicle-mounted camera and a monitoring camera.

Japanese Unexamined Patent Application Publication No. 2004-363666 (hereinafter referred to as Patent Reference 1) discloses a technique of capturing frames each having a different exposure time in length, and combining the captured frames. Since a luminance range to be captured for one frame varies depending on a length of an exposure time, the dynamic range may be expanded by combining frames each having a different luminance range due to a different exposure time.

FIG. 1 illustrates a schematic view of a solid-state imaging device of Patent Reference 1. The solid-state imaging device includes pixel units 171, photodiodes 172, noise cancellers 173, and an amplifier 174. The photodiode 172 is a light-receiving element.

A timing controller in the drawing controls the constituent elements included in the solid-state imaging device, and causes the constituent elements to select a pixel row and a pixel column to be operated. When a voltage level of a terminal Ri is set to be high according to an instruction of the timing controller, a cathode of the photodiode 172 is set to a higher voltage value (initial value). Here, i is a natural number ranging from 1 to N. Next, when a voltage level of the terminal Ri is set to be low, the solid-state imaging device is shifted to a charge integration mode that lowers a cathode potential according to light entering the photodiode 172.

In a row of a terminal Si having a high voltage level, the cathode potential of the photodiode 172 is outputted to an output terminal through the noise canceller 173 and the amplifier 174.

When a voltage level of a terminal Ri becomes high again, a cathode of the photodiode 172 is set to a higher voltage value (initial value), and is shifted to a new charge integration mode.

FIG. 2 illustrates exposure times and output timings in the solid-state imaging device described in Patent Reference 1. The exposure time is divided into 3 categories, long (LAi), short (SAi), and very short (VSAi), and LRi, SRi, and VSRi represent timing when a signal obtained in a charge integration mode is outputted after the respective exposure times, where i is a natural number ranging from 1 to N. Since light is converted to a voltage according to an intensity of light, in other words, normal light during the LAi, strong light during the SAi, and very strong light during the VSAi, a wide dynamic range becomes possible with the solid-state imaging device.

However, since the technique of Patent Reference 1 needs to store signals separately, depending on respective exposure times, LAi, SAi, and VSAi, it takes long processing time. Furthermore, the solid-state imaging device is necessary to provide a storing unit that stores the signals, and a signal combining unit that combines signals, outside the solid-state imaging device to execute post-processing.

SUMMARY OF THE INVENTION

In view of the problem, the present invention has an object of combining signals for a short period of time in a solid-state imaging device without such a storing unit and a charge combining unit outside the solid-state imaging device to expand a dynamic range of the solid-state imaging device.

In order to achieve the object, the solid-state imaging device according to the present invention has pixel units that are two-dimensionally arranged, and includes: a light-receiving element that generates an optical signal charge corresponding to an intensity and an exposure time of light entering the light-receiving element; a transferring unit configured to transfer the optical signal charge; a charge combining unit configured to generate a signal voltage corresponding to the optical signal charge; a storing unit configured to store a signal voltage corresponding to the optical signal charge in the charge combining unit; and a voltage setting unit configured to set a value of a voltage in the charge combining unit to a value corresponding to the signal voltage stored by the storing unit.

Thereby, an optical signal charge can be transferred sequentially for a plurality of times without any influence of voltage level variation in a pixel according to the passage of time. Furthermore, a charge combining unit is not necessary outside a solid-state imaging device, thus expanding a dynamic range obtained by combining optical signal charges for a short period of time in a solid-state imaging device.

Furthermore, each of the pixel units preferably includes the light-receiving element, the transferring unit, the charge combining unit, the storing unit, and the voltage setting unit.

Thereby, an optical signal charge can be transferred sequentially for a plurality of times without any influence of voltage level variation in a pixel according to the passage of time. Furthermore, a charge combining unit is not necessary outside a solid-state imaging device, thus combining optical signal charges for a short period of time in a solid-state imaging device.

Furthermore, the charge combining unit may include: an accumulating unit configured to accumulate the optical signal charge; a reset unit configured to reset a voltage in the accumulating unit; and a difference circuit unit configured to output a voltage obtained by combining, with a predetermined reference voltage, a difference voltage between a voltage obtained by resetting the voltage in the accumulating unit and the signal voltage corresponding to the optical signal charge accumulated by the accumulating unit, and the voltage setting unit may set the signal voltage stored by the storing unit as the reference voltage of the difference circuit unit.

Thereby, optical signal charges can be combined with fewer functional variations in pixels, because an optical signal voltage corresponding to an optical signal charge generated in a light-receiving element is added to a voltage obtained as a difference between the reset output voltage and the combined signal output voltage all the time.

Furthermore, each of the pixel units may include the light-receiving element, the transferring unit, the accumulating unit, and the reset unit, and the difference circuit unit, the storing unit, and the voltage setting unit are formed for each column signal line connected to a portion of the pixel units that are arranged in an identical column.

Thereby, the number of circuit elements and an area for each solid-state imaging device can be reduced, because the difference circuit unit, the storing unit, and the voltage setting unit are provided not for each pixel unit but for each column signal line.

Furthermore, the voltage setting unit may include one of: a transistor including a gate terminal connected to the storing unit, a drain terminal connected to a power supply unit, and a source terminal connected to the charge combining unit through a switch; and a transistor including a gate terminal connected to the storing unit, a source terminal connected to a power supply unit, and a drain terminal connected to the charge combining unit through a switch.

Since a voltage setting unit may be formed by simple circuit elements, a circuit scale of an entire solid-state imaging device is simplified.

Furthermore, the voltage setting unit may include an output terminal that is connected to a column signal line common to a portion of the pixel units arranged in a column direction, and the output terminal may output the value corresponding to the signal voltage stored by the storing unit as a pixel signal.

Thereby, the voltage setting unit can amplify the voltage in the storing unit, and also functions as an output circuit. Thus, reduction in the number of circuit elements increases an area ratio (open area ratio) of a light-receiving element to a pixel, and improves a sensitivity of the pixel. Alternatively, since an area for each solid-state imaging device can be reduced, the number of chips that can be placed on a semiconductor substrate may increase, thus reducing costs.

Furthermore, the reset voltage applying circuit may be connected to an end of the column signal line, and apply a reset voltage to the charge combining unit and the storing unit through the output terminal.

Since a reset circuit is not necessary in a pixel and a column signal line functions also as a wiring for applying a reset voltage, an area ratio (open area ratio) of a light-receiving element to a pixel increases, and a sensitivity of the pixel may be improved. Alternatively, since an area for each solid-state imaging device can be reduced, the number of chips that can be placed on a semiconductor substrate may increase, thus reducing costs.

Furthermore, the voltage setting unit may include a buffer circuit that inputs a voltage outputted from the storing unit.

Thereby, signal charges can be precisely combined by preventing a voltage from dropping due to a load in a circuit element included in the voltage setting unit and in a peripheral circuit.

Furthermore, the storing unit may include: a first capacitor connected, through a switch, between an output terminal in the difference circuit unit and the charge combining unit; and a second capacitor connected between the output terminal and a ground, and the voltage setting unit may set, in the charge combining unit, a voltage held in the first capacitor.

Thereby, the voltage setting unit and the storing unit may be made up of less number of circuit elements. Furthermore, signal charges can be precisely combined through use of a capacitor, thus preventing a voltage from dropping due to a load in a circuit element included in the voltage setting unit itself and in a peripheral circuit.

Furthermore, the storing unit may include a third capacitor having one terminal connected to the charge combining unit through a switch, and having the other terminal connected to a bias circuit.

Thereby, a voltage drop occurring in the voltage setting unit connected in a latter stage may be compensated by applying a bias voltage when a voltage is set in the voltage setting unit, thus enabling precise combination of signal charges.

The present invention can be realized not only as a solid-state imaging device having the aforementioned characteristics but also as a solid-state imaging apparatus including such a solid-state imaging device that has the same structure and advantage as that of the solid-state imaging device.

Furthermore, the present invention can be realized not only as the solid-state imaging device or the solid-state imaging apparatus that has the aforementioned characteristics but also as a camera that includes such a solid-state imaging device or the solid-state imaging apparatus having the same structure and advantage.

Furthermore, the present invention can be realized not only as the solid-state imaging device or the solid-state imaging apparatus having such characteristic units therein but also as a driving method having the characteristic units of the solid-state imaging device or the solid-state imaging apparatus as steps.

According to the solid-state imaging device of the present invention, an optical signal charge can be transferred sequentially for a plurality of times, enabling combination of the charges in the solid-state imaging device for a short period of time. Thus, a dynamic range may be expanded without a charge combining unit outside the solid-state imaging device.

FURTHER INFORMATION ABOUT TECHNICAL BACKGROUND TO THIS APPLICATION

The disclosure of Japanese Patent Application No. 2007-226663 filed on Aug. 31, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 18A illustrates a functional block diagram of a solid-state imaging apparatus including the solid-state imaging device according to the first embodiment of the present invention.

FIG. 18B illustrates a functional block diagram of a conventional solid-state imaging apparatus.

DESCRIPTION OF THE PREFERRED EMBODIMENTS

First Embodiment

A solid-state imaging device according to the first embodiment includes in a pixel: a charge combining unit that combines signal voltages corresponding to optical signal charges generated in light-receiving elements; a storing unit that stores a signal voltage in the charge combining unit; and a voltage setting unit that sets a value of a voltage in the charge combining unit to a value corresponding to the signal voltage stored by the storing unit.

According to the first embodiment, voltages corresponding to respective optical signal charges generated in a plurality of exposure times are added in a pixel for a short period of time without any influence of the voltage level variation according to the passage of time in the charge combining unit. Thus, a dynamic range may be expanded without any external circuit.

With reference to drawings, the solid-state imaging device according to the first embodiment of the present invention is hereinafter described.

Figure 1:
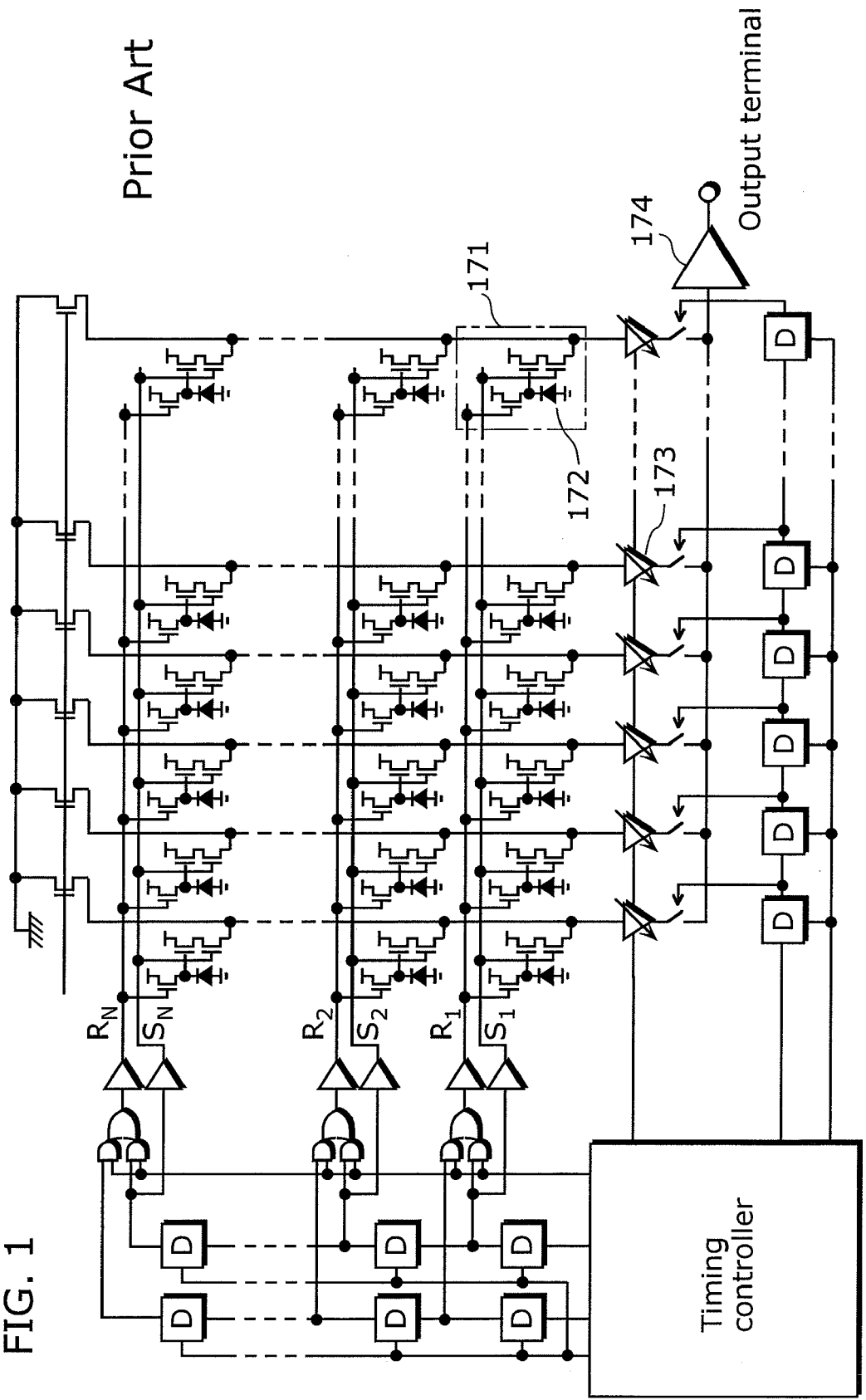
FIG. 1 illustrates a schematic view of a solid-state imaging device of Patent Reference 1.
Figure 2:
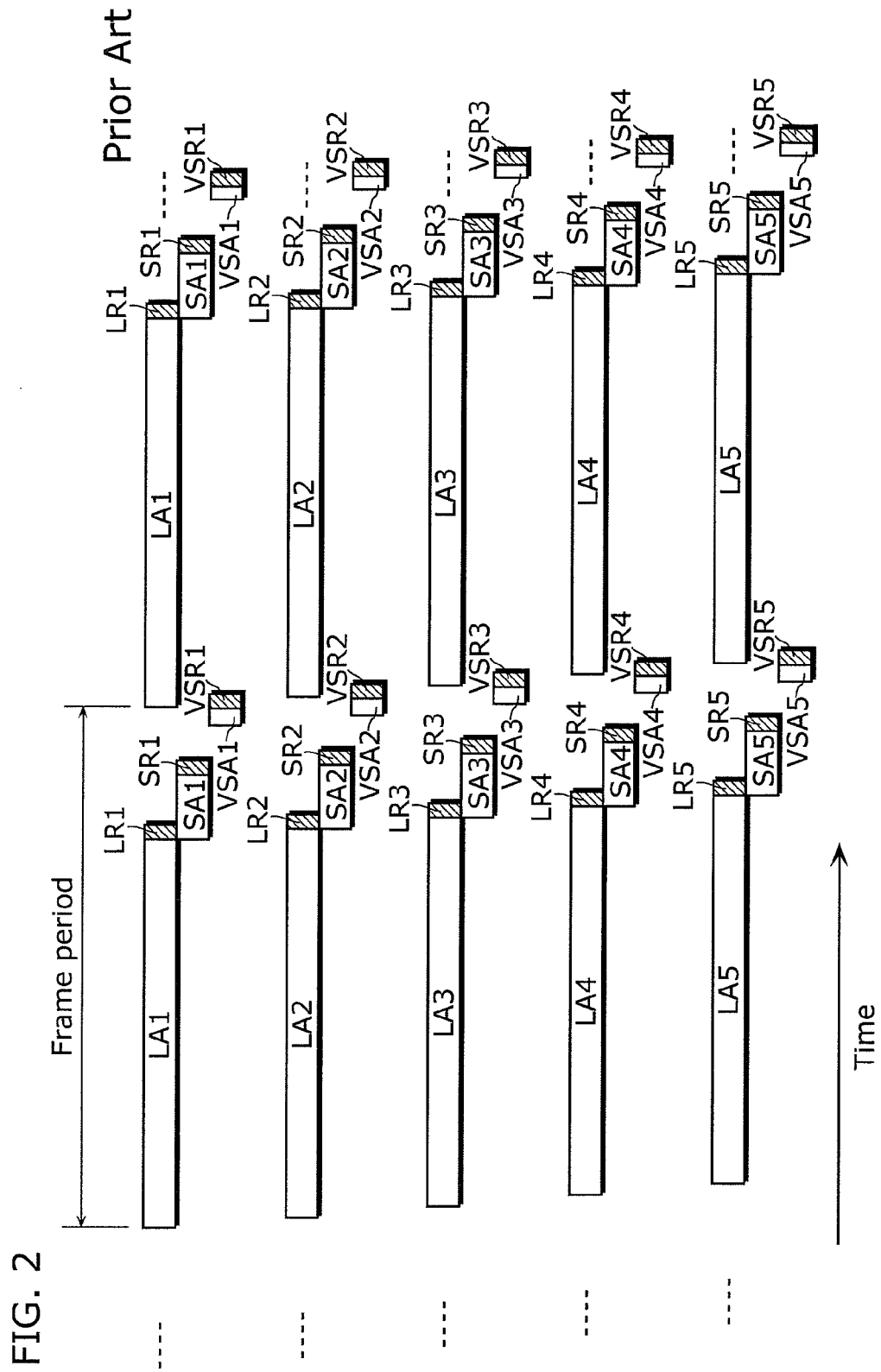
FIG. 2 illustrates exposure times and output timings in the solid-state imaging device described in Patent Reference 1.
Figure 3:
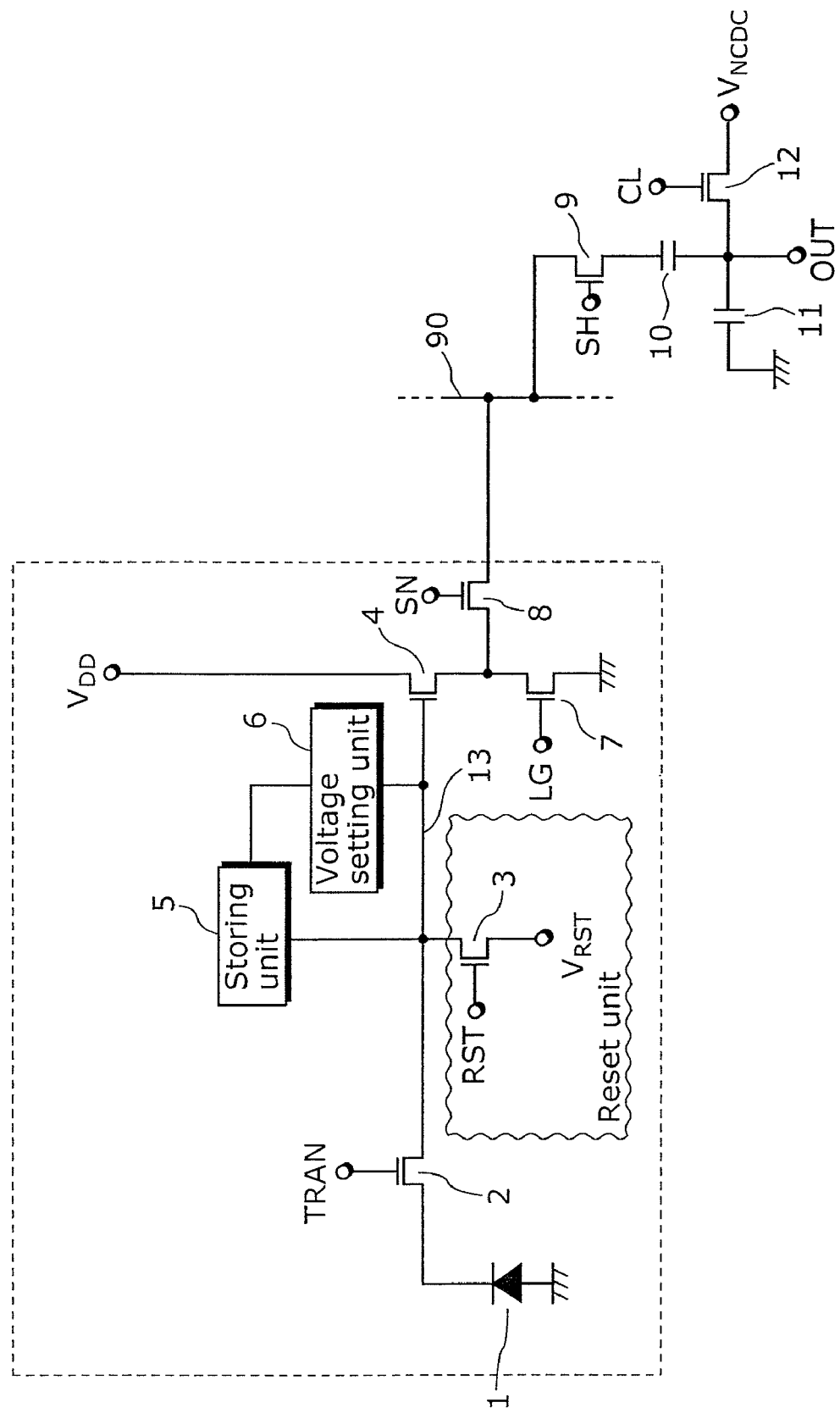
FIG. 3 illustrates a configuration of a basic circuit of the solid-state imaging device according to the first embodiment of the present invention.

FIG. 3 illustrates a structure of a basic circuit of the solid-state imaging device according to the first embodiment of the present invention. The solid-state imaging device includes a photodiode 1, Metal Oxide Semiconductor (MOS) transistors 2, 3, 4, 7, 8, 9, and 12, a storing unit 5, a voltage setting unit 6, capacitors 10 and 11, and an accumulating unit 13.

The photodiode 1 is a light-receiving element that generates an optical signal charge according to an intensity of light entering the light-receiving element. The MOS transistor 2 is included in a transferring unit, and is a transfer gate for transferring the signal charge generated in the photodiode 1 to the accumulating unit 13. When the MOS transistor 2 conducts electricity, the charge generated in the photodiode 1 is transferred to the accumulating unit 13. Then, a voltage corresponding to the charge is generated in the accumulating unit 13.

The MOS transistor 3 is a reset transistor that resets a voltage in the accumulating unit 13 to be an initial voltage $V_{RST}$, and is included in a reset unit.

The MOS transistor 4 is included in a circuit unit, and functions as a source follower in combination with the MOS transistor 7.

The storing unit 5 stores a voltage corresponding to a voltage in the accumulating unit 13. The voltage setting unit 6 is a voltage setting circuit that sets a voltage in the accumulating unit 13 to a voltage corresponding to a signal stored in the storing unit 5.

The MOS transistor 8 functions as a switch for selecting a pixel row. A pixel includes a portion enclosed by a dashed line in FIG. 3.

Furthermore, the MOS transistors 9 and 12, and the capacitors 10 and 11 form a noise canceller. A difference between an output voltage in a state where a pixel is reset and an output voltage corresponding to an optical signal charge is outputted from the noise canceller, thus reducing offset voltage variations in respective pixels.

Here, the reset unit may be combined with the voltage setting unit 6. In other words, the reset circuit may use a part of the voltage setting unit 6.

The accumulating unit 13 is included in a charge combining unit, and combines a signal voltage generated through transferring of an optical signal charge generated from a light-receiving element by the transferring unit, and a voltage set by the voltage setting unit.

Figure 4:
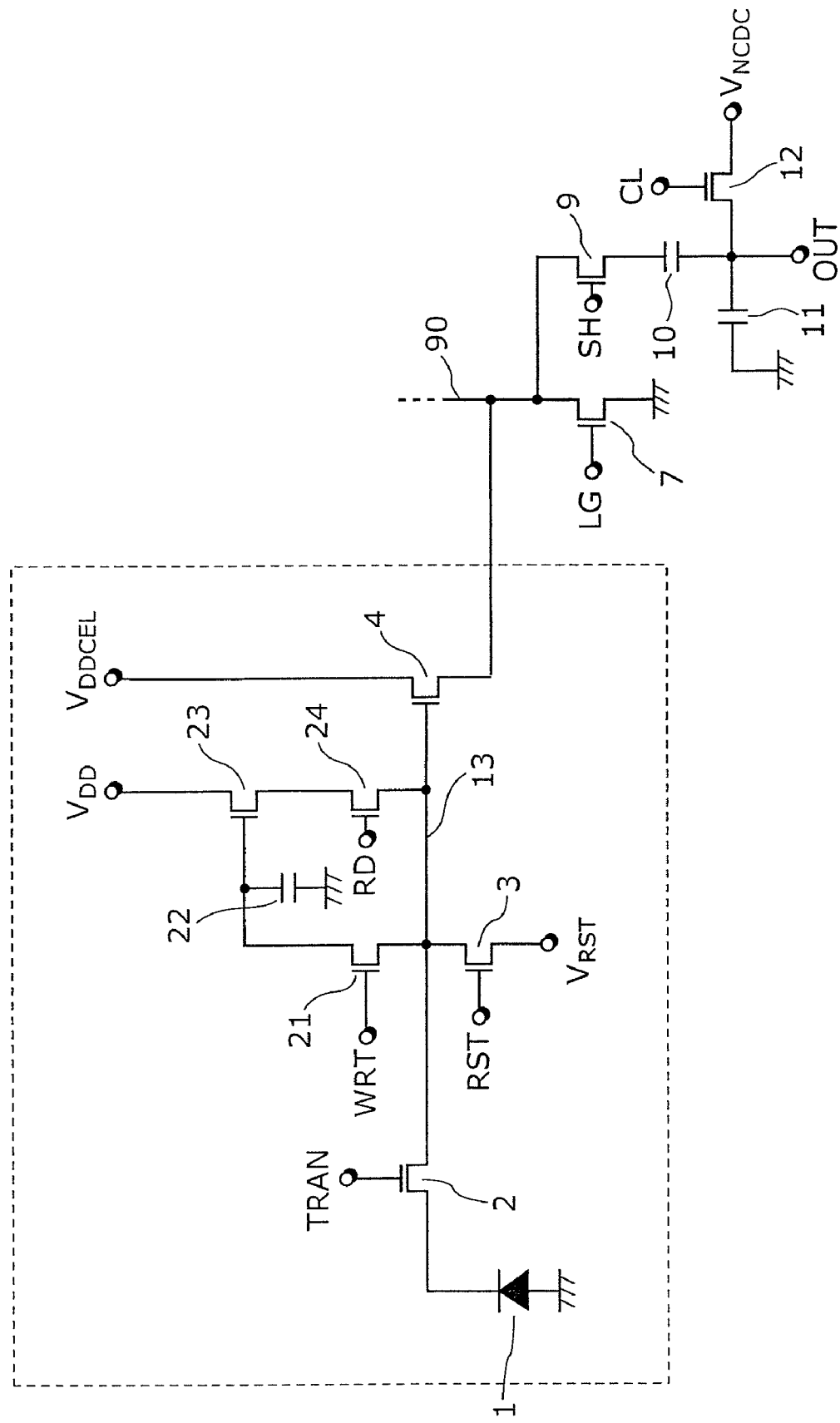
FIG. 4 illustrates a configuration of a basic circuit of the solid-state imaging device according to the first embodiment of the present invention.

FIG. 4 illustrates a circuit diagram embodying the structure of the basic circuit of the solid-state imaging device illustrated in FIG. 3. In other words, the storing unit and the voltage setting unit in FIG. 3 are illustrated with specific circuit elements in FIG. 4.

The solid-state imaging device in FIG. 4 includes the photodiode 1, the MOS transistors 2, 3, 4, 7, 9, and 12, MOS transistors 21, 23, and 24, the capacitors 10 and 11, a capacitor 22, and the accumulating unit 13. Compared to the storing unit 5 and the voltage setting unit 6 in the circuit structure of FIG. 3, the storing unit 5 and the voltage setting unit 6 in FIG. 4 are illustrated in specific circuit elements.

Furthermore, FIG. 4 differs from FIG. 3 in excluding the MOS transistor 8 therein.

In FIG. 4, although the MOS transistor 7 is not included in the pixel enclosed by the dashed line, it is provided in every column signal line connected to pixel units arranged in an identical column. The circuit elements in FIG. 4 that are different from those of FIG. 3 are hereinafter described in details except for the common elements described for FIG. 3.

The MOS transistor 8 described in FIG. 3 is a switch for selecting a pixel row. For example, after charge combining units for all pixels in a circuit as illustrated in FIG. 4 are grounded using the reset circuits and other units, each of the MOS transistors 8 may select a row, read the selected row by setting, in the charge combining unit, a value corresponding to a voltage in a corresponding storing unit, and read the next row by grounding the charge combining unit. Furthermore, non-selected rows may be certainly turned off by controlling, as a signal, $V_{DDCEL}$ connected to the MOS transistor 4 for each row.

Although the MOS transistor 7 is provided not for each pixel but for each column signal line in order to reduce the number of circuit elements, the MOS transistor 7 may be provided for each pixel.

A combination of the MOS transistor 21 and the capacitor 22 functions as a storing unit that stores a voltage corresponding to a voltage in the accumulating unit 13. A terminal of the capacitor 22 is grounded. When the MOS transistor 21 is turned on, in other words, when a voltage level of WRT in FIG. 4 is set to a power supply voltage $V_{DD}$ (high, hereinafter), the capacitor 22 holds a voltage that corresponds to a charge amount in the accumulating unit 13 and that is determined in proportion to a capacitance in the accumulating unit 13 and a capacitance in the capacitor 22.

A combination of the MOS transistors 23 and 24 functions as a voltage setting unit that sets a voltage in the accumulating unit 13 to a voltage corresponding to a charge amount in the capacitor 22. The MOS transistor 23 has a gate terminal connected to the capacitor 22, a drain terminal connected to the power supply voltage $V_{DD}$, and a source terminal connected to a drain terminal of the MOS transistor 24.

The MOS transistor 23 supplies a voltage corresponding to the gate voltage to the drain terminal. The MOS transistor 24 has the gate terminal connected to a control signal line RD, and the source terminal connected to the accumulating unit 13.

When the control signal line RD is turned on, the MOS transistor 24 sets a voltage in the accumulating unit 13 to a voltage in the drain terminal of the MOS transistor 24.

Thereby, an optical signal charge received in the photodiode 1 is accumulated in the accumulating unit 13 through the MOS transistor 2. Next, a voltage corresponding to the accumulated charge is stored in the capacitor 22 through the MOS transistor 21. The stored voltage is set in the accumulating unit 13 through the MOS transistors 23 and 24. Thus, even when an optical signal charge is accumulated in the accumulating unit 13 for a plurality of times, signal voltages corresponding to respective optical signal charges are cumulatively added in the accumulating unit 13.

Here, the voltage corresponding to the optical signal charges in the accumulating unit 13 is temporarily stored in the storing unit, and is reset in the accumulating unit 13 by the voltage setting unit 6 as necessary. Thus, the signal voltages that are cumulatively added are not influenced by voltage level variation in the accumulating unit 13 according to the passage of time. Here, terminals of TRAN, RST, WRT, and RD are respectively provided for each pixel row, and an output terminal of the MOS transistor 4 (a terminal that is not connected to $V_{DDCEL}$) is commonly connected to a column signal line 90 for each pixel column.

Figure 5:
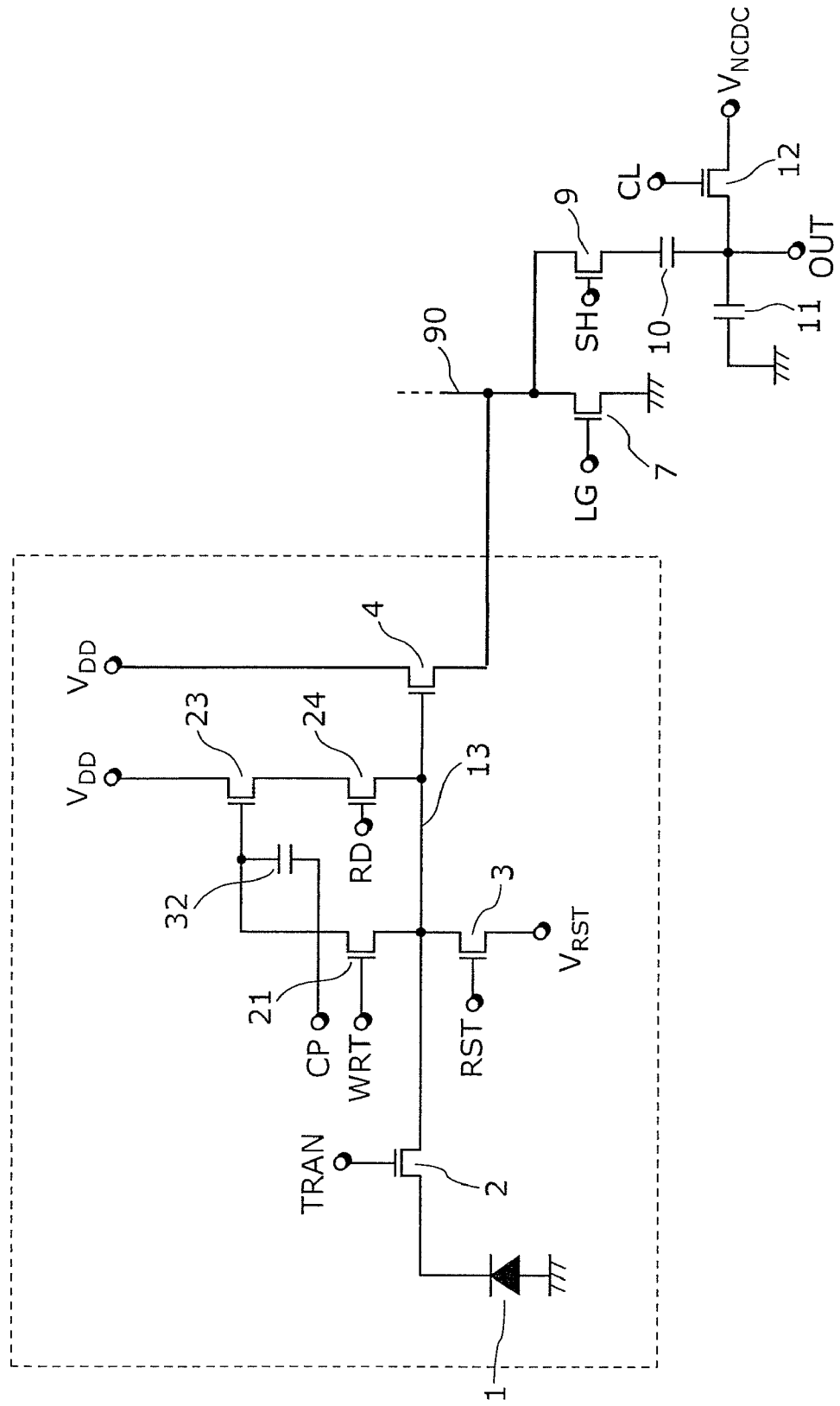
FIG. 5 illustrates a configuration of the solid-state imaging device of the first variation according to the first embodiment of the present invention.

FIG. 5 illustrates a circuit structure of a solid-state imaging device of a first variation according to the first embodiment of the present invention.

The solid-state imaging device in FIG. 5 includes the photodiode 1, the MOS transistors 2, 3, 4, 7, 9, 12, 21, 23, and 24, the capacitors 10 and 11, a capacitor 32, and the accumulating unit 13. The circuit structure illustrated in FIG. 5 differs from the circuit structure in FIG. 4 in the capacitor 32 having a terminal that is not grounded. Circuit elements in FIG. 5 that are different from those of FIG. 4 are hereinafter described in details except for the common elements described for FIG. 4.

A terminal of the capacitor 32 is not grounded, but is connected to a control signal line CP. The connection compensates a voltage drop. A voltage in a source terminal of the MOS transistor 23 (terminal connected to the MOS transistor 24) drops only by a threshold voltage $V_T$ from a voltage $V_G$ that is applied to a gate terminal of the MOS transistor 23. Thus, when a voltage held in the capacitor 32 is read to the MOS transistors 23 and 24, a bias voltage in the control signal line CP is applied to the capacitor 32. Thereby, a potential of the capacitor 32 is boosted by the voltage $V_T$, and the MOS transistor 23 outputs a drain voltage having the same voltage value as that of a voltage held in the capacitor 32.

In other words, a voltage in the capacitor 32 that is a part of a storing unit is compensated for a voltage drop occurring in the MOS transistor 23, and the resulting voltage is set in the accumulating unit 13. Thus, even when an optical signal charge is accumulated in the accumulating unit 13 for a plurality of times, signal voltages corresponding to respective optical signal charges are cumulatively added in the accumulating unit 13.

Figure 6:
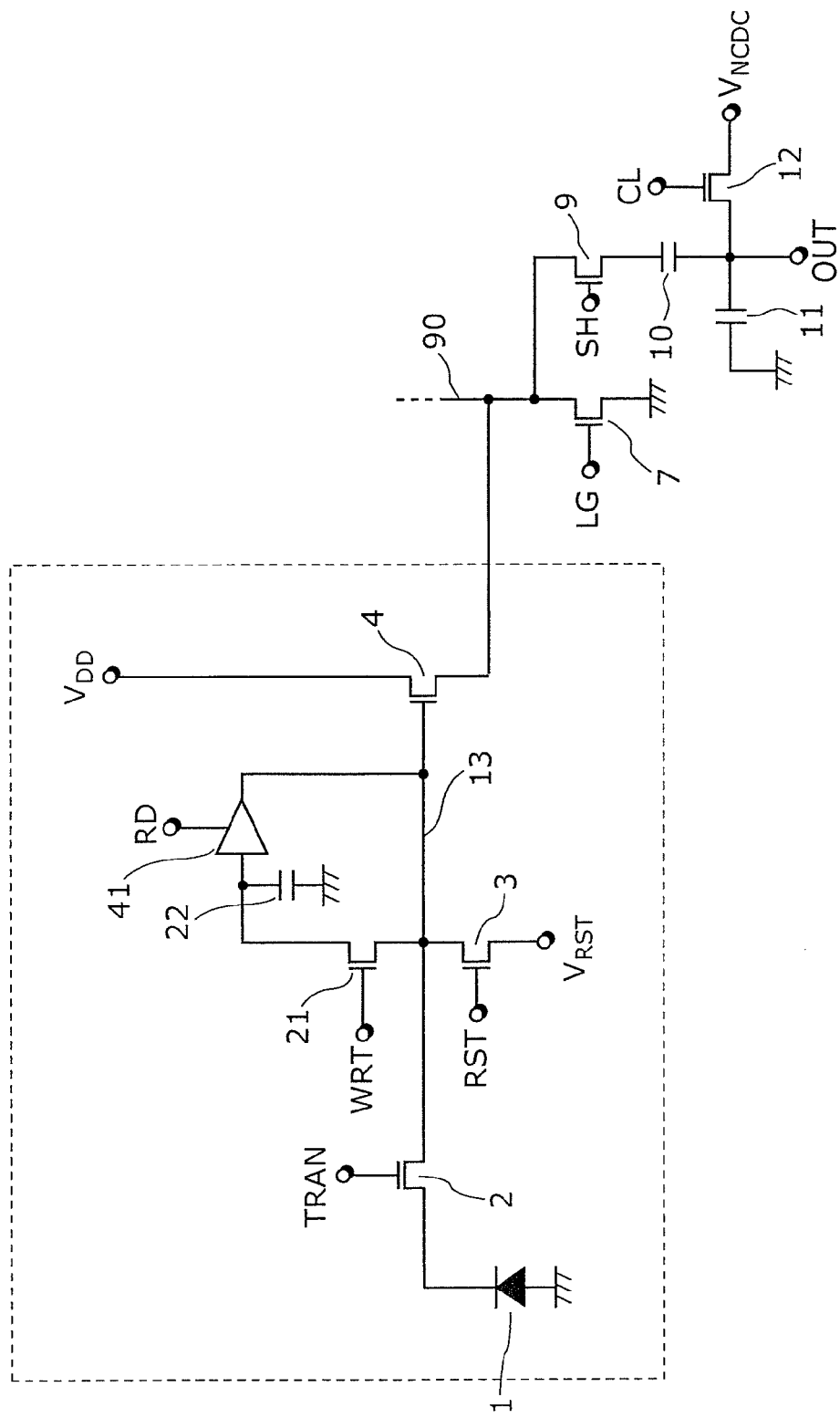
FIG. 6 illustrates a configuration of the solid-state imaging device of the second variation according to the first embodiment of the present invention.

FIG. 6 illustrates a structure of a solid-state imaging device of a second variation according to the first embodiment of the present invention. The solid-state imaging device in FIG. 6 includes the photodiode 1, the MOS transistors 2, 3, 4, 7, 9, 12, and 21, the capacitors 10, 11, and 22, the accumulating unit 13, and a buffer circuit 41.

The circuit structure illustrated in FIG. 6 differs from the circuit structure in FIG. 4 in including the buffer circuit 41 instead of the MOS transistors 23 and 24. Circuit elements in FIG. 6 that are different from those of FIG. 4 are hereinafter described in details except for the common elements described for FIG. 4.

An input terminal of the buffer circuit 41 is connected to the capacitor 22, and an output terminal of the buffer circuit 41 is connected to the accumulating unit 13. The control signal line RD controls on/off of the buffer circuit 41. A circuit of series of two inverter circuits may be given as an example of a structure of the buffer circuit 41. Furthermore, a circuit having an amplification factor 1 using an operational amplifier is used as a buffer circuit.

Such a structure enables a voltage in the capacitor 22 that functions as a storing unit to be set in the accumulating unit 13 without any voltage drop caused by the voltage setting unit 6. Thus, even when an optical signal charge is accumulated in the accumulating unit 13 for a plurality of times, signal voltages corresponding to respective optical signal charges are cumulatively added with precision in the accumulating unit 13.

Figure 7:
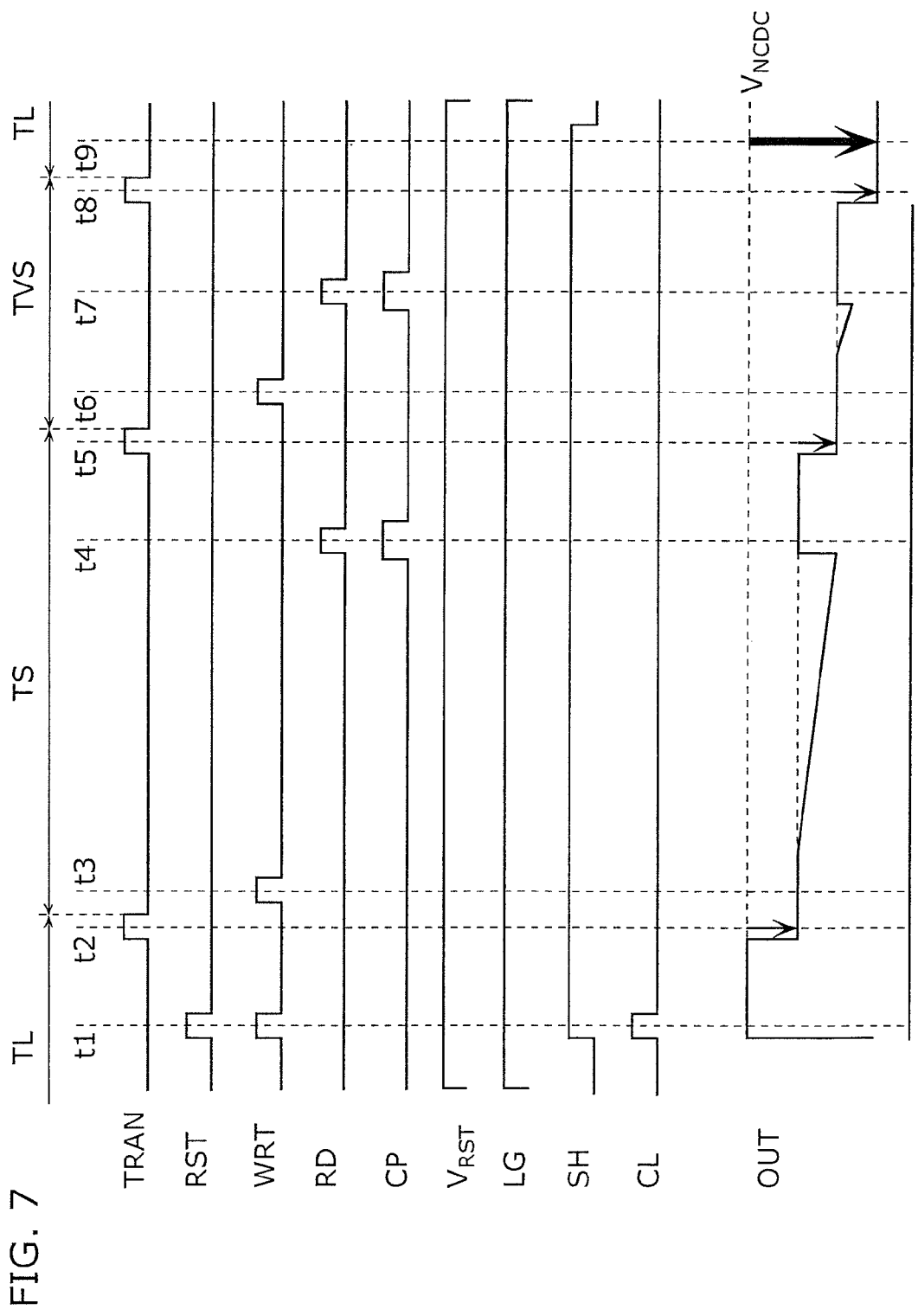
FIG. 7 illustrates a drive timing chart of the solid-state imaging device of the first variation according to the first embodiment of the present invention.

FIG. 7 illustrates a drive timing chart of the solid-state imaging device of the first variation according to the first embodiment of the present invention.

Here, operations of the solid-state imaging device are described in details using the circuit structure illustrated in FIG. 5. First, at a time t0, a voltage level of control signals RST and WRT becomes high, and a voltage in a contact point between the capacitor 32 and the MOS transistor 21 that functions as a storing unit, and a voltage in the accumulating unit 13 are initialized by an initial voltage $V_{RST}$. Furthermore, a voltage level of a control signal CL becomes high, and a voltage level of an output terminal OUT becomes $V_{NCDC}$ at the time t1.

Next, at a time t2, a voltage level of a control signal TRAN of the MOS transistor 2 becomes high, and an optical signal charge generated in the photodiode 1 during a period TL is transferred to the accumulating unit 13. Furthermore, a potential of the terminal OUT is changed by an amount of a voltage in the accumulating unit 13 that is subtracted from $V_{NCDC}$.

The changed amount of voltage is obtained by allocating, to the capacitors 10 and 11 in proportion to a capacitance in the capacitor 10 and a capacitance in the capacitor 11, a product of a voltage changed in the accumulating unit 13 and a gain in a source follower including the MOS transistors 4 and 7.

Even after the period TL, since a control signal SH is on all the time, a potential of the terminal OUT may have the property of reflecting a change in a potential of the accumulating unit 13.

Next, at a time t3, the voltage level of WRT becomes high, and the charges transferred to the accumulating unit 13 are allocated to accumulating unit 13 and the capacitor 32, respectively in proportion to a capacitance in the accumulating unit 13 and a capacitance in the capacitor 32.

Here, during a period TS after the time t3, the potential of the terminal OUT varies according to the passage of time. During the period TS that is a period of 100 μsec equal to 1/100 of the TL period that is a normal exposure time (approximately 10 msec), for example, a crystal defect or a dark current causes generation of a negative charge in the accumulating unit 13, thus further reducing the potential from the time t3. Since an operation, as if a charge was transferred from the photodiode 1, is performed despite no transferring from the photodiode 1, the potential is reduced. Such reduction normally causes defects referred to as "white defects".

Due to the aforementioned reason, immediately before transferring a charge obtained from the photodiode 1 to the accumulating unit 13, a voltage in the accumulating unit 13 needs to be set to a fixed reference voltage.

Thus, when respective signals generated during the periods, TL, TS, and TVS are combined in the accumulating unit 13, for example, there are cases where an optical signal charge obtained during the period TS is added to the accumulating unit 13 where an optical signal charge obtained during the period TL is retained. Due to voltage variations according to the passage of time, the "white defects" occur, and thus an captured image is degraded.

The present invention solves such a "white defect" problem in operations after a time t4 in the solid-state imaging device.

At the time t4, when a voltage level of the control signal line CP connected to the capacitor 32 and the control signal RD of the MOS transistor 24 becomes high, the voltage of the capacitor 32 is boosted by a voltage in the control signal line CP. Then, the voltage in the accumulating unit 13 is set to a voltage corresponding to the voltage stored in the capacitor 32 through the MOS transistor 24. Here, in order to prevent a voltage dropped by a threshold voltage $V_T$ from a gate voltage in the MOS transistor 23, from being provided to the accumulating unit 13, a voltage approximately identical to that of the capacitor 32 is set in the accumulating unit 13 by boosting the voltage in the control signal line CP by $V_T$.

Next, at the time t5, the voltage level of the control signal TRAN of the MOS transistor 2 becomes high again, and an optical signal charge generated in the photodiode 1 during the period TS is transferred to the accumulating unit 13.

Next, at the time t6, the voltage level of WRT becomes high, and the voltage set in the accumulating unit 13 at the time t5 is added to the voltage set in the accumulating unit 13 at the time t4. Then, the resulting voltage obtained by adding the voltage accumulated in the accumulating unit 13 during the period TL and the voltage accumulated in the accumulating unit 13 during the period TS is allocated to the accumulating unit 13 and the capacitor 32, respectively in proportion to a capacitance in the accumulating unit 13 and a capacitance in the capacitor 32.

At the time t7, the same processing is performed in the same manner as at the time t4, and the resulting voltage obtained by adding the voltage accumulated in the accumulating unit 13 during the period TL and the voltage accumulated in the accumulating unit 13 during the period TS is set in the accumulating unit 13.

Next, at the time t8, the same processing is performed in the same manner as at the time t5, and the control signal TRAN of the MOS transistor 2 becomes high again for the third times. Here, an optical signal charge generated in the photodiode 1 exposed to light during a period TVS is transferred to the accumulating unit 13.

Finally, at the time t9, the respective signals generated during the periods, TL, TS, and TVS are added in the accumulating unit 13 with precision, and an amount of a voltage corresponding to addition of respective signals obtained during the times t2, t5, t8 is outputted to the terminal OUT.

As described above, the solid-state imaging device according to the first embodiment of the present invention makes it possible to store voltages each corresponding to an optical signal charge generated in a light-receiving element, to set the resulting voltage in the accumulating unit 13 using the voltage setting unit 6, and to transfer, to the accumulating unit 13, an optical signal charge newly generated in a light-receiving element. Thus, without any influence of white defects occurring in the accumulating unit, a combination of optical signal charges in a pixel is completed with precision.

Furthermore, capacitance elements in a storing unit, such as a MOS capacitor and a Metal Insulation Metal (MIM) capacitor, are used to achieve a function of storing a voltage signal with less noise caused by current leakage and other factors.

Figure 8:
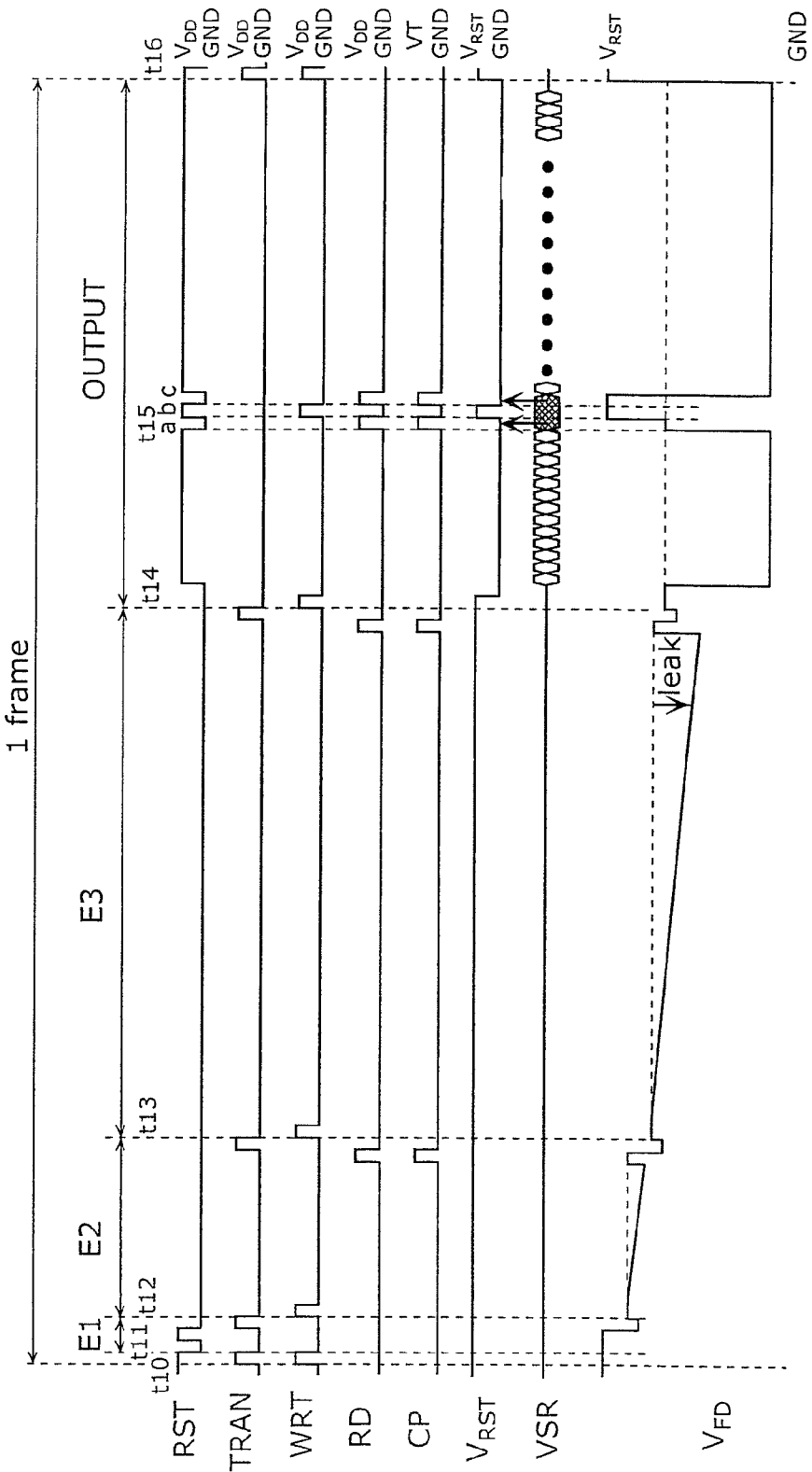
FIG. 8 illustrates a drive timing chart of the solid-state imaging device of the third variation according to the first embodiment of the present invention.

FIG. 8 illustrates a drive timing chart of a solid-state imaging device of a third variation according to the first embodiment of the present invention. The circuit structure is the same as that of FIG. 5. Compared to a driving method used in FIG. 7, a driving method used in FIG. 8 includes detecting signals in ascending order of light exposure times in length. Furthermore, FIG. 8 differs from FIG. 7 in illustrating timing when one row is selected from among pixel rows and a corresponding signal is read.

In the driving method according to the first embodiment of the present invention, optical signals are stored, transferred, and combined in all pixels simultaneously. The signals are read from each of the pixels by scanning each pixel row, thus enabling a global shutter operation. For performing the operation, various control signals are controlled by a driving unit that is not included in the solid-state imaging device. Hereinafter, a solid-state imaging apparatus including such a driving unit is described.

Figure 9:
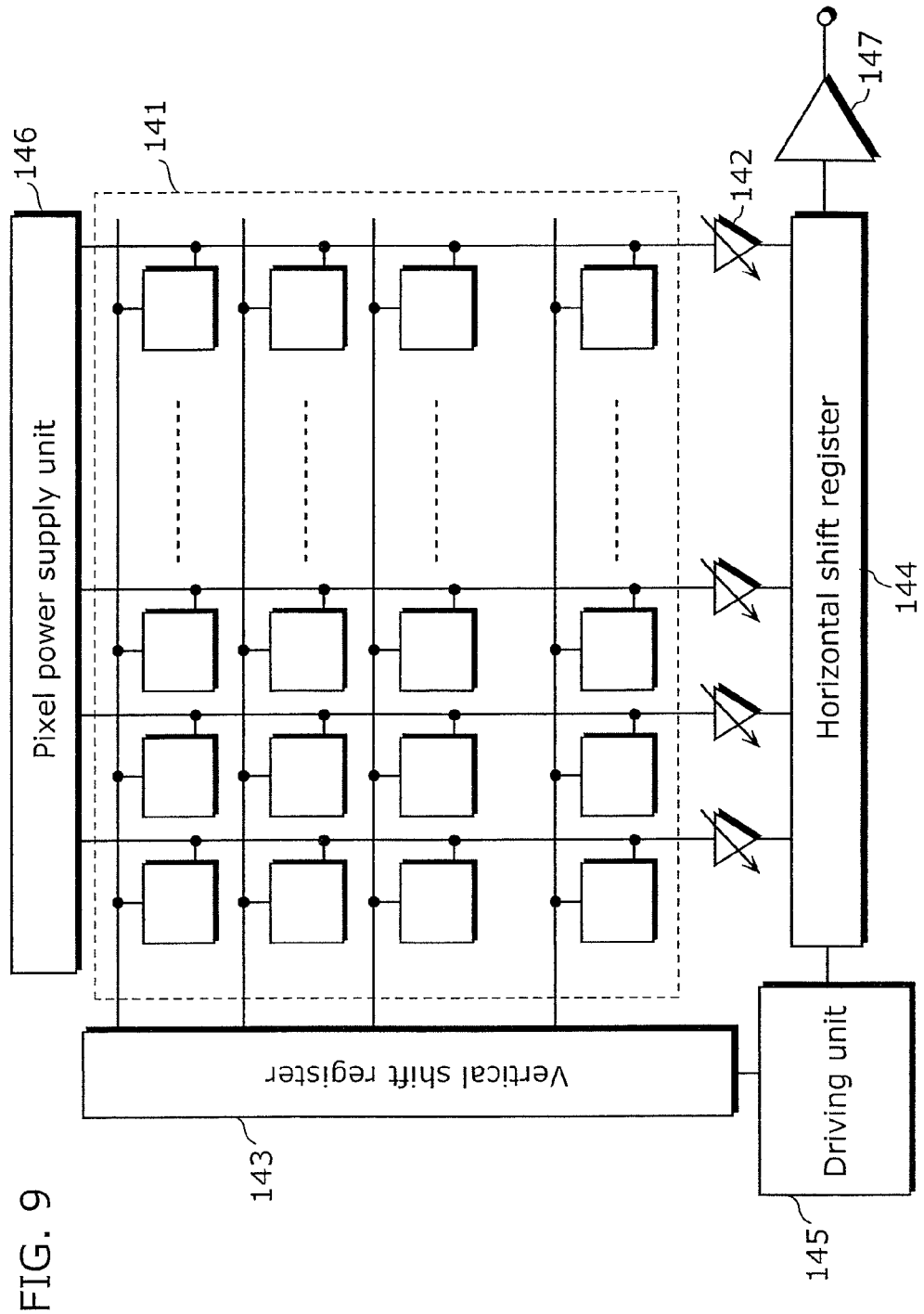
FIG. 9 illustrates a functional configuration of a solid-state imaging apparatus including the solid-state imaging device according to the present invention.

FIG. 9 illustrates a functional structure of a solid-state imaging apparatus including the solid-state imaging device according to the present invention. The solid-state imaging device in FIG. 9 includes a pixel unit 141, noise cancellers 142, a vertical shift register 143, a horizontal shift register 144, a driving unit 145, a pixel power supply unit 146, and an amplifier 147.

As described above, the pixel unit 141 includes light-receiving elements, transferring units, accumulating units, storing units, voltage setting units, and a portion of circuit units, and has functions of combining charge signals respectively received in different exposure times to generate the signal voltage.

Each of the noise cancellers 142 includes a portion of the circuit units, and a function of reading voltages accumulated in a corresponding accumulating unit with precision.

The vertical shift register 143 reads a pixel row selected in response to an instruction from the driving unit 145.

The horizontal shift register 144 reads a pixel column selected in response to an instruction from the driving unit 145.

The driving unit 145 controls the pixel unit 141, the noise cancellers 142, the vertical shift register 143, and the horizontal shift register 144.

The pixel power supply unit 146 supplies a constant electric current to the pixel unit 141.

The amplifier 147 amplifies a signal voltage obtained in the pixel unit 141.

Returning to FIG. 8, a driving method of the solid-state imaging device according to the present invention is again described. First, at the time t10, the driving unit 145 sets a voltage level of the control signals RST, TRAN, and WRT to be high simultaneously in all of the pixels. Thereby, the photodiode 1, the accumulating unit 13, and a contact point between the MOS transistor 21 and the capacitor 32 are initialized by an initial voltage $V_{RST}$.

Next, at the time t11, the driving unit 145 sets a voltage level of the control signal RST to be high again, and resets a voltage of the accumulating unit 13, where the voltage varies easily, to the initial voltage $V_{RST}$.

Next, at the time t12 after a period E1, the driving unit 145 sets a voltage level of TRAN to be high, and a charge generated in the photodiode 1 is transferred to the accumulating unit 13. Then, the voltage level of WRT becomes high, and a capacitance in the accumulating unit 13 and a capacitance in the capacitor 32 are coupled. A part of the charge is moved to the capacitor 32 according to an amount of the capacitance allocated to the capacitor 32 from the coupled capacitance.

Here, the following equation is obtained, that is, $V_{FD}'=C_S/(C_S+C_{FD}) \times V_{FD}$, wherein a capacitance in the accumulating unit 13 is $C_{FD}$, a capacitance in the capacitor 32 is $C_S$, a voltage in the accumulating unit 13 before coupling the capacitance is $V_{FD}$, and the voltage after the coupling is $V_{FD}'$.

Next, at the time t13, before combining the optical signal charges accumulated during a period E2, the driving unit 145 sets a voltage level of the control signal RD to be high, and sets, in the accumulating unit 13, a voltage corresponding to the signal charge accumulated during the period E1. Then, when the driving unit 145 sets TRAN to be high, the optical signal charges accumulated during the period E2 are transferred to the accumulating unit 13, and signals corresponding to the charges are combined.

Similarly, at the time t14, after combining the optical signal charges accumulated during a period E3, the driving unit 145 sets a voltage level of WRT to be high, and the combined signals are stored in the respective storing units in the pixel unit 141.

The operations up to this stage, namely, global shutter operations are simultaneously performed in all of the pixels in a chip.

Next, an operation for reading a signal obtained by combining 3 different signals respectively generated during the periods E1, E2, and E3 is described.

When the driving unit 145 initializes the initial voltage $V_{RST}$ to be 0 V in all of the pixels and sets a voltage level of RST to be high, the voltage in the accumulating unit 13 becomes 0 V, and the MOS transistor 4 is turned off. As a result, no signal is outputted to the column signal line 90.

In this state, the driving unit 145 operates the vertical shift register 143 per column. At the time t15, a voltage level of RST only in rows selected by the vertical shift register 143 becomes low, and the voltage level of RD becomes high. As a result, a voltage corresponding to the combined signals is set in the accumulating unit 13. Then, the MOS transistor 4 that functions as a source follower in combination with the MOS transistor 7 through the column signal line 90 is turned on, and a voltage corresponding to the voltage in the accumulating unit 13 is outputted to the column signal line 90.

When noise is removed using Correlated Double Sampling (CDS), first, the driving unit 145 resets a voltage in the MOS transistor 3 to a reset voltage $V_{RST}$ at the time t15b and sets a voltage level of RST to be high. Thus, an initial state indicating no light input is set in the accumulating unit 13, and the state is stored in the storing unit. Next, a voltage corresponding to the initial state stored at the time t15c is set in the accumulating unit 13, thus obtaining an output signal when the MOS transistor 3 is reset. By detecting a difference between the reset output voltage and the combined signal output voltage, functional variations in the pixels of the MOS transistor 4 may be reduced.

When the vertical shift register is driven in all of the pixels, reading will end. In this driving method, image data is taken in all of the pixels simultaneously, and the respective image data are outputted sequentially. After all of the data are outputted, a next image starts to be taken in a pixel.

Thus, distortion in images that is detected by a conventional image device using a CMOS sensor hardly occurs. In the driving operation illustrated in FIG. 7, charge signals are accumulated in the accumulating unit 13 in descending order of exposure times in length. For example, when an image is captured for 3 different time periods, such as 30 msec, 300 μsec, and 3 μsec on a 1/100 unit basis and the obtained images are combined, in the case where an image is first exposed to light for 30 msec that is the longest exposure time, the light exposure operations may be performed simultaneously with outputting of voltage signals from other pixel rows, enabling acceleration of the entire operations.

Alternatively, as illustrated in the driving operation in FIG. 8, first, an image is exposed to high-intensity light for a short period of time, and then, another light is exposed to the image for a long period of time. Thus, noise may be reduced by light having low and medium luminance, and much higher definition images may be obtained.

Figure 10:
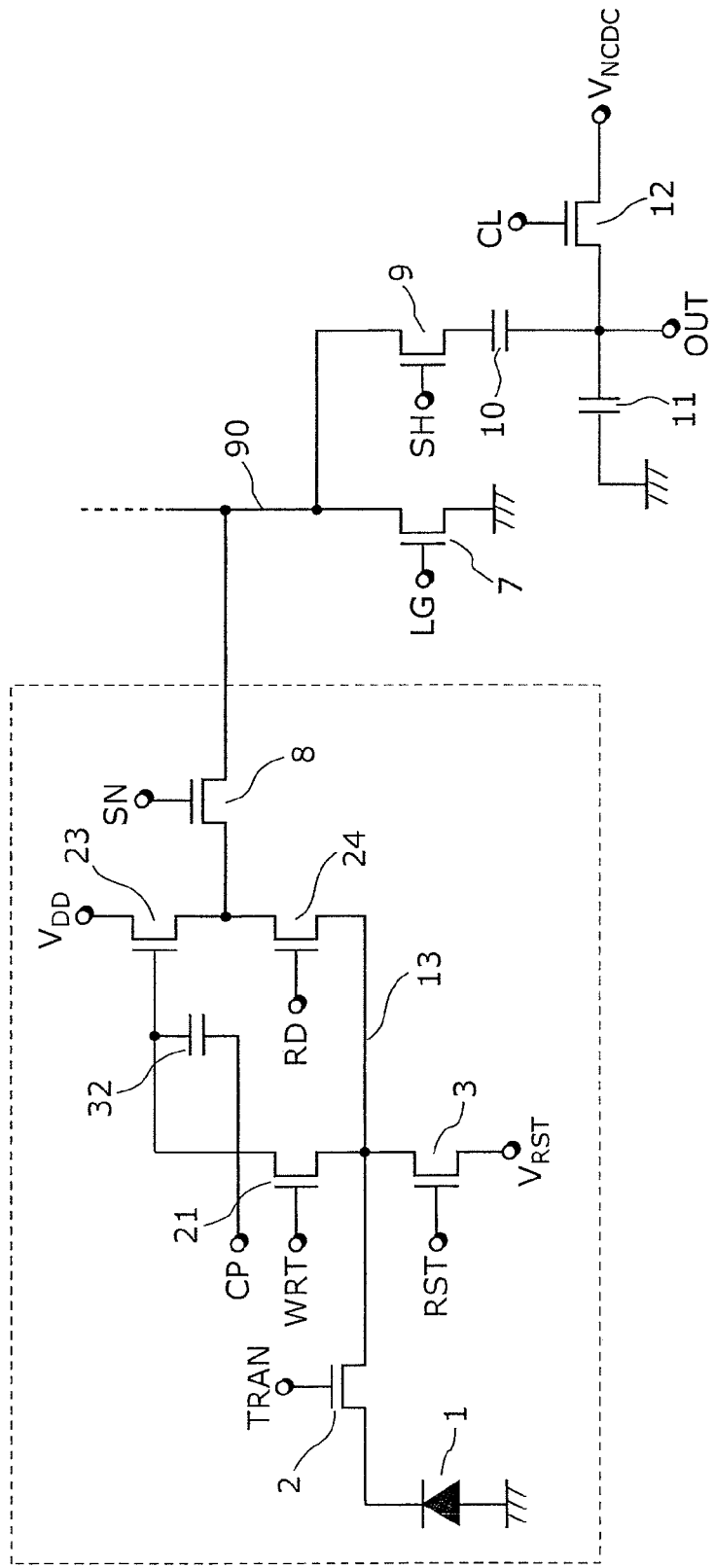
FIG. 10 illustrates a circuit configuration of the solid-state imaging device of the fourth variation according to the first embodiment of the present invention.

FIG. 10 illustrates a circuit structure of a solid-state imaging device of a fourth variation according to the first embodiment of the present invention. The solid-state imaging device in FIG. 10 includes the photodiode 1, the MOS transistors 2, 3, 7, 8, 9, 12, 21, 23, and 24, the capacitors 10, 11, and 32, and the accumulating unit 13.

The circuit structure illustrated in FIG. 10 differs from the circuit structure in FIG. 5 in excluding the MOS transistor 4. Furthermore, the MOS transistor 8 that is illustrated in FIG. 3 and that selects a pixel is inserted between the MOS transistor 23 and the column signal line 90. Since the circuit structure in FIG. 10 is the same as that of FIG. 5 in an operation for accumulating an optical signal charge for a plurality of times, the description is omitted. The fourth variation of the first embodiment is characterized in an operation for reading signal charges accumulated, and thus the feature is hereinafter described in details.

Figure 11:
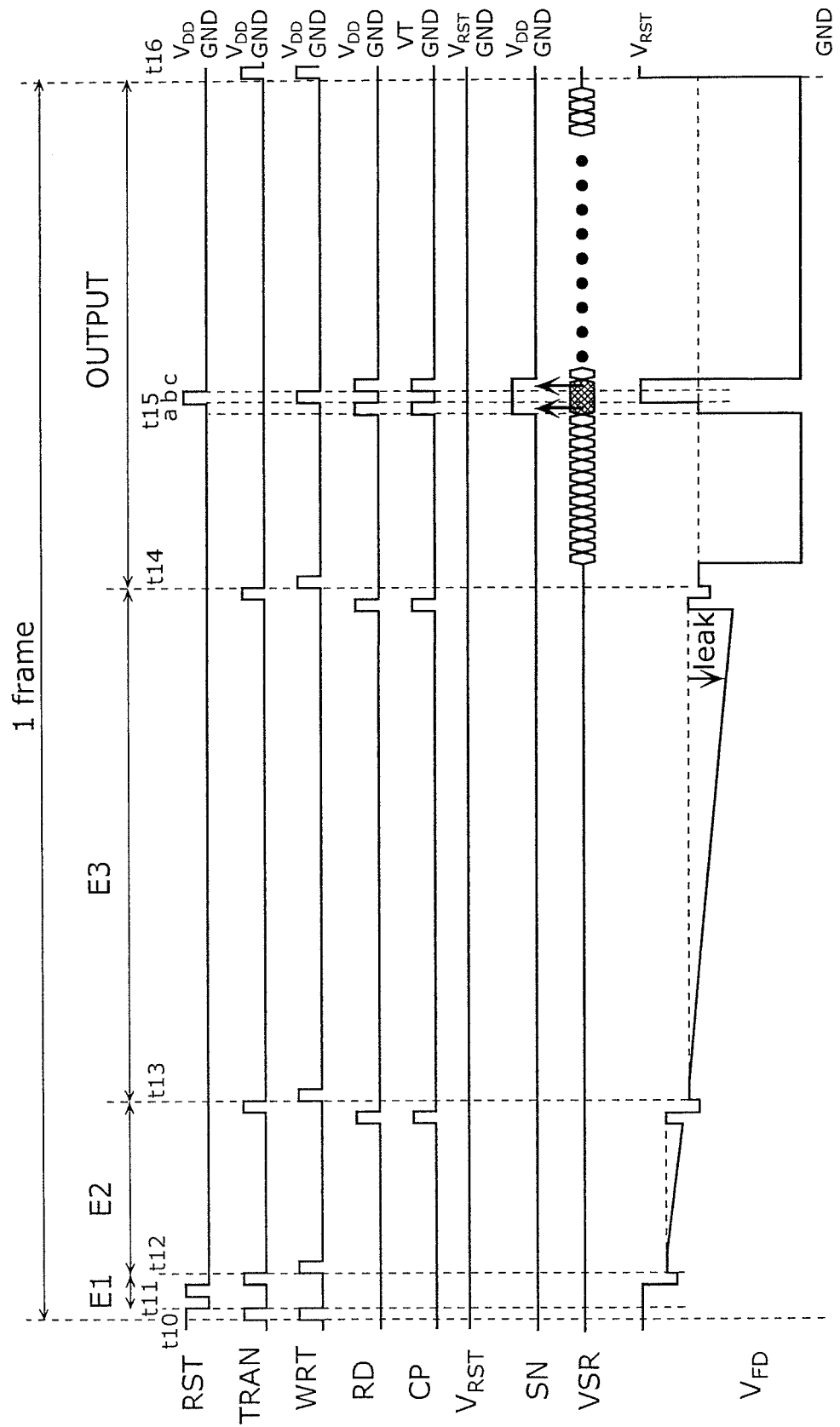
FIG. 11 illustrates a drive timing chart of the solid-state imaging device of the fourth variation according to the first embodiment of the present invention.

FIG. 11 illustrates a drive timing chart of the solid-state imaging device of the fourth variation according to the first embodiment of the present invention. Optical signals are stored, transferred, and combined in all pixels simultaneously, and when signals are read from each of the pixels by scanning each row, a global shutter operation can be performed. The global shutter operation is the same as operations in the third variation illustrated in FIG. 8, that is, operations from the time t10 to the time t14, and operations to be performed when a voltage level of WRT becomes high after the time t14 and the combined signals are stored in the capacitor 32. Through these time periods, a low voltage is applied to a control terminal SN of the MOS transistor 8, and the pixel and the column signal line 90 are separated from each other. Next, an operation for reading a signal obtained by combining 3 different signals respectively generated during the periods E1, E2, and E3 is described.

When the driving unit 145 initializes the initial voltage $V_{RST}$ to be 0V in all of the pixels and sets the voltage level of RST to be high, the voltage in the accumulating unit 13 becomes 0V, and the MOS transistor 4 is turned off. As a result, no signal is outputted to the column signal line 90.

In this state, the driving unit 145 operates the vertical shift register 143 per column, and sets the voltage level of the control terminal SN in a row selected by the vertical shift register 143 to be high. Thereby, the MOS transistor 8 is turned on. Through these operations, the pixel is connected to the column signal line 90, and the MOS transistors 7 and 23 are connected in series, thus forming a source follower circuit and outputting, to the column signal line 90, a signal corresponding to the voltage stored in the capacitor 32.

When noise is removed using the CDS, an initial state where no light is inputted is stored in the capacitor 32 by setting the voltage level of RST and WRT to be high using the driving unit 14 at the time t15b. At the time t15c, a reset signal corresponding to a gate voltage corresponding to the initial state stored is outputted from the MOS transistor 23. By detecting a difference between the reset output voltage and an output voltage of the combined signal, functional variations in the MOS transistors 23 of the pixels may be reduced.

When the vertical shift register is driven in all of the pixels, reading will end. In this driving method, image data is taken in all of the pixels simultaneously, and the respective image data are outputted sequentially. After all of the data are outputted, a next image starts to be taken in a pixel.

In the fourth variation according to the first embodiment, the voltage setting unit serves as a part of a source follower circuit that outputs a signal, and has an advantage of reducing the number of circuit elements included in a pixel.

Figure 12:
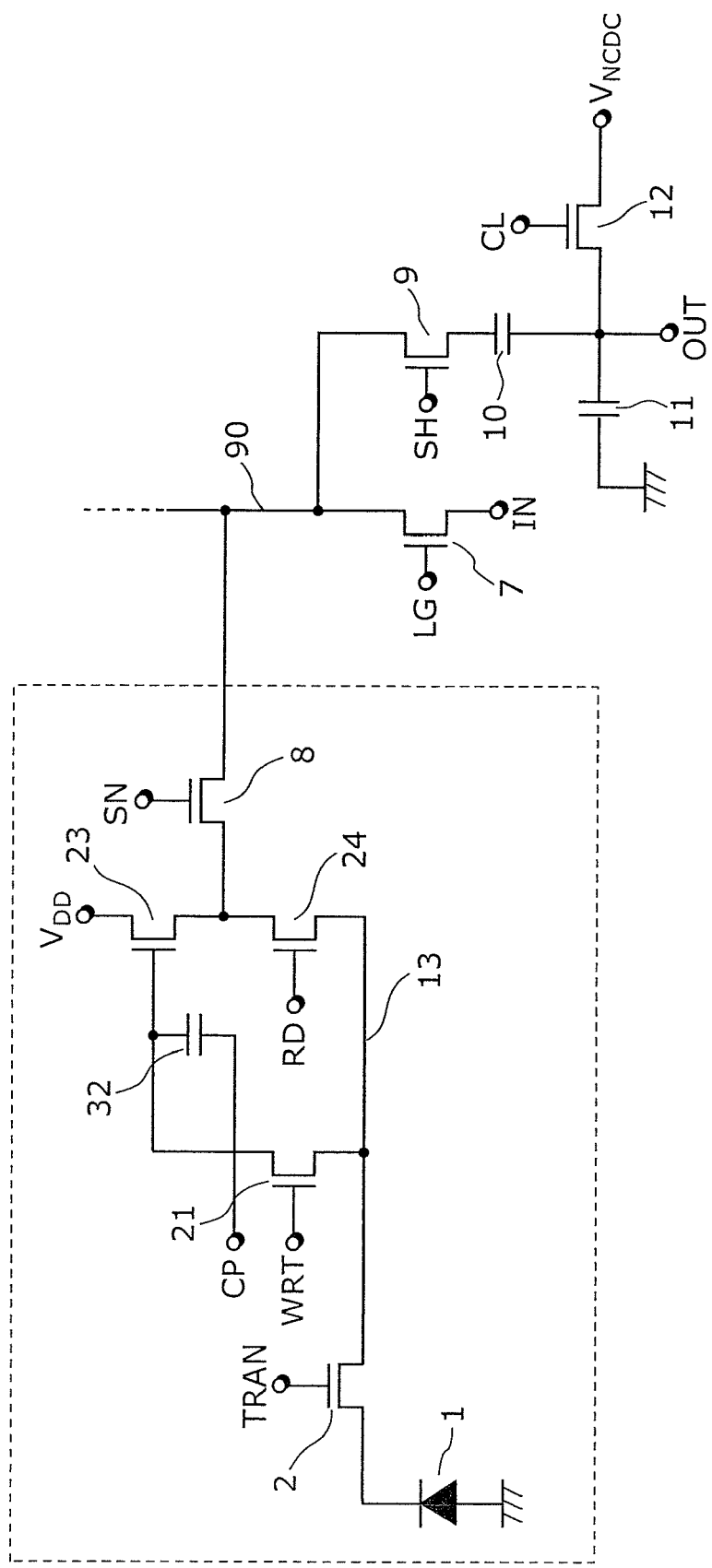
FIG. 12 illustrates a configuration of the solid-state imaging device of the fifth variation according to the first embodiment of the present invention.

FIG. 12 illustrates a structure of the solid-state imaging device of a fifth variation according to the first embodiment of the present invention. The solid-state imaging device in FIG. 12 includes the photodiode 1, the MOS transistors 2, 7, 8, 9, 12, 21, 23, and 24, the capacitors 10, 11, and 32, and the accumulating unit 13. The circuit structure illustrated in FIG. 12 differs from the circuit structure in FIG. 10 in excluding the MOS transistor 3. Furthermore, although a source terminal of the MOS transistor 7 is grounded in FIG. 10, a control signal IN is applied to the source terminal of the MOS transistor 7 in the fifth variation. Since the circuit structure in FIG. 12 is the same as those of FIGS. 4, 5, and 10 in the operation for accumulating an optical signal charge for a plurality of times, the description is omitted. The fifth variation of the first embodiment is characterized in a reset operation, thus the feature is described in details.

Figure 13:
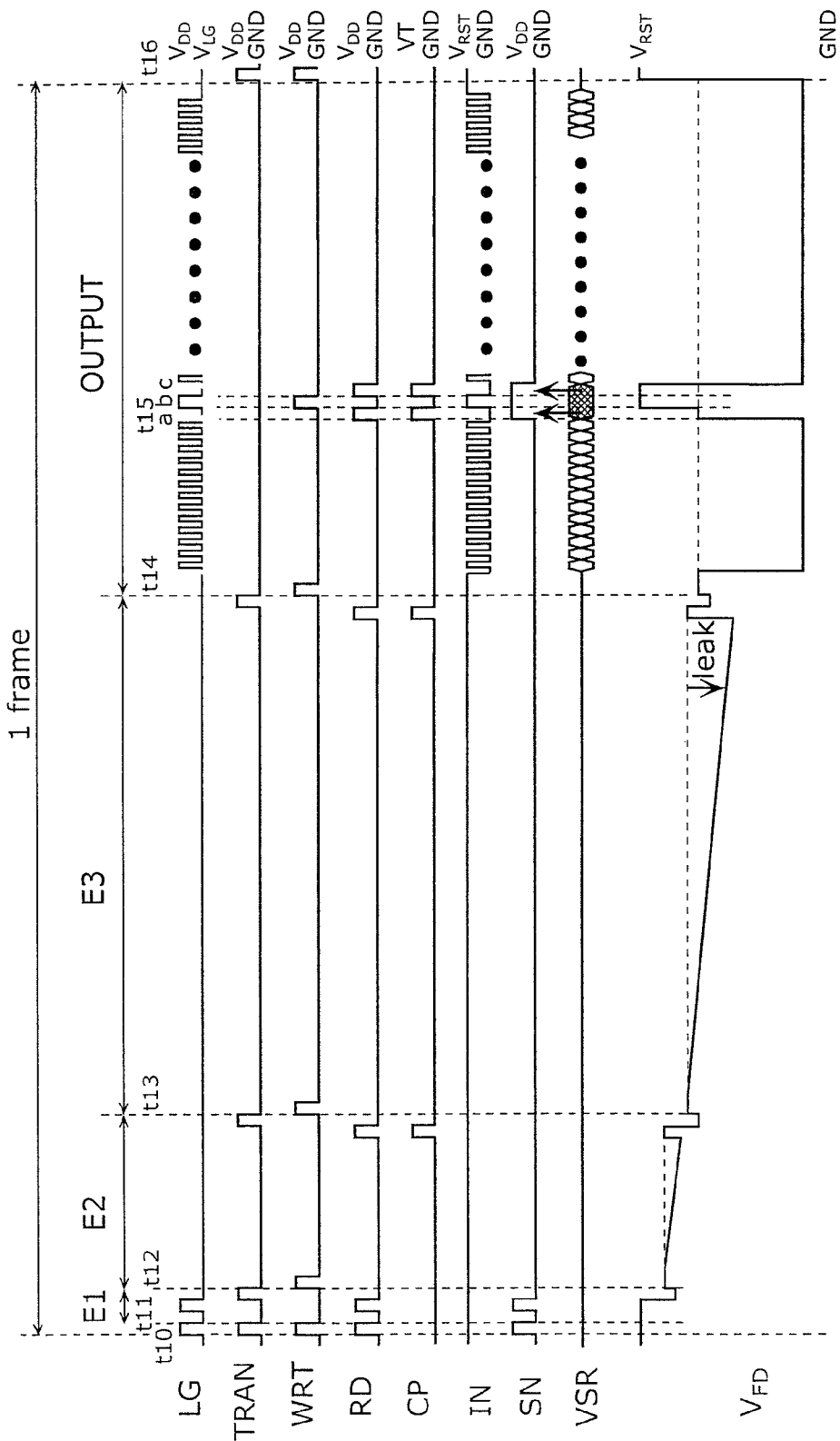
FIG. 13 illustrates a drive timing chart of the solid-state imaging device of the fifth variation according to the first embodiment of the present invention.

FIG. 13 illustrates a drive timing chart of the solid-state imaging device of the fifth variation according to the first embodiment of the present invention. Optical signals are stored, transferred, and combined in all pixels simultaneously, and when signals are read from each of the pixels by scanning each row, a global shutter operation can be performed. Among a series of operations, FIG. 13 differs from an operation for resetting the initial voltage $V_{RST}$ in the third variation illustrated in FIG. 8.

The reset operation is performed at the times t10, t11, and t15. In this case, a control terminal LG of the MOS transistor 7 is turned on by applying a power supply voltage $V_{DD}$ thereto, and the initial voltage $V_{RST}$ is applied to IN. In the reset operation at the times t10 and t15, the voltage level of the terminals SN, RD, and WRT is set to be high to reset the voltage in the accumulating unit 13 and the capacitor 32. In the reset operation at the time t11, the voltage level of the terminals SN and RD is set to be high to reset the voltage in the accumulating unit 13.

During a time period when the reset operation is not performed, a voltage $V_{LG}$ is applied to a control terminal LG of the MOS transistor 7, and IN indicates a grounding potential. When the MOS transistor 7 and the MOS transistor 23 are connected in series in a reading operation to form a source follower circuit, the voltage $V_{LG}$ is selected to keep a linear relationship between the voltage stored in the capacitor 32 and the signal voltage outputted to the column signal line 90, and to prevent saturation of the output voltage.

In the fifth variation according to the first embodiment, the MOS transistor 7 included in the source follower circuit also functions as a reset circuit, thus bringing an advantage of reducing the number of circuit elements included in a pixel. Furthermore, the structure can omit a wiring where the reset voltage $V_{RST}$ and a control signal RST in an reset operation are applied to a pixel, thus reducing an area for each solid-state imaging device.

Figure 14B:
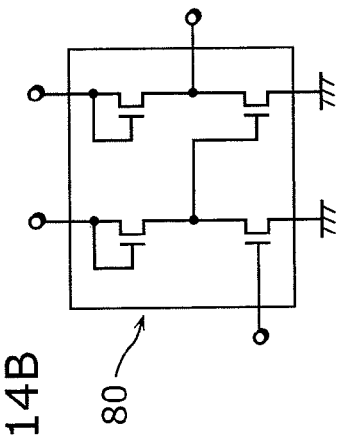
FIG. 14B illustrates a configuration of a buffer circuit.
Figure 14A:
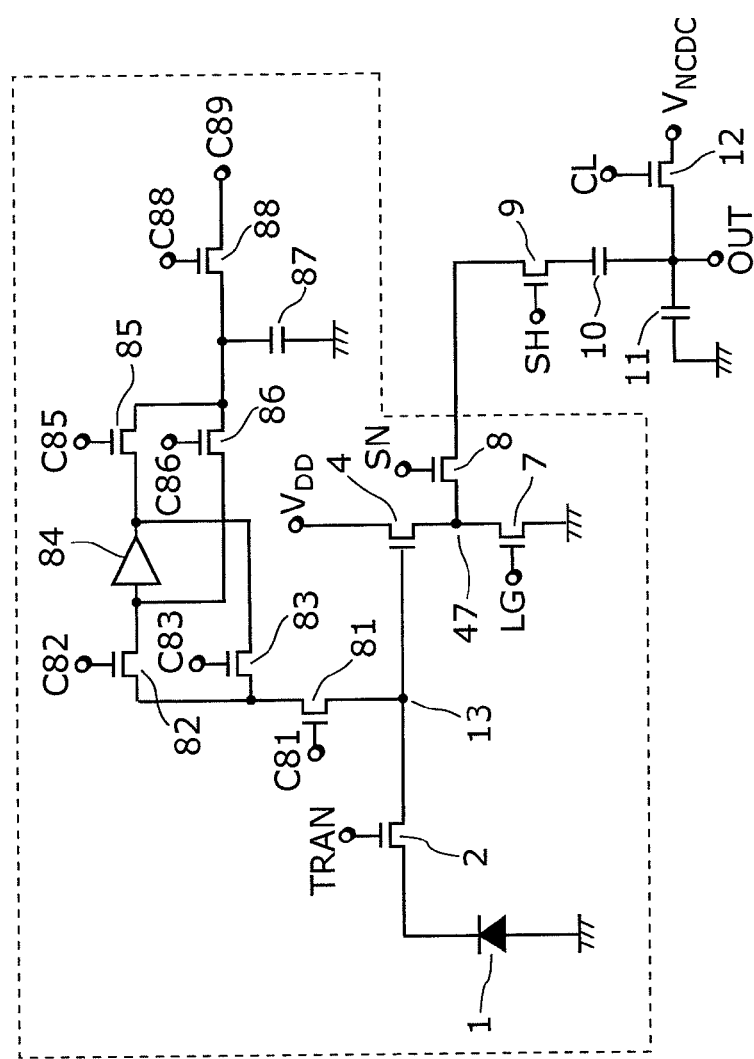
FIG. 14A illustrates a configuration of the solid-state imaging device of the sixth variation according to the first embodiment of the present invention.

FIG. 14A illustrates a structure of a solid-state imaging device of a sixth variation according to the first embodiment of the present invention. The solid-state imaging device in FIG. 14A includes the photodiode 1, the MOS transistors 2, 4, 7, 8, 9, and 12, MOS transistors 81, 82, 83, 85, 86, and 88, the capacitors 10 and 11, a capacitor 87, the accumulating unit 13, and a source follower output point 47, and a buffer circuit 84.

FIG. 14A differs from FIG. 3 in the structure where functions of a storing unit, a reset unit, and a voltage setting unit are shared among circuit elements, and where the reset unit is not independently provided in each circuit. Circuit elements in FIG. 14A that are different from those of FIG. 3 are hereinafter described in details except for the common elements described for FIG. 3.

A gain in the buffer circuit 84 is 1. The buffer circuit 84 may be the buffer circuit 80 including an inverting circuit having two inverter circuits as illustrated in FIG. 14B.

An optional bias voltage is applied to a bias voltage terminal C89. A pixel includes a portion enclosed by a dashed line in FIG. 14A.

Figure 15:
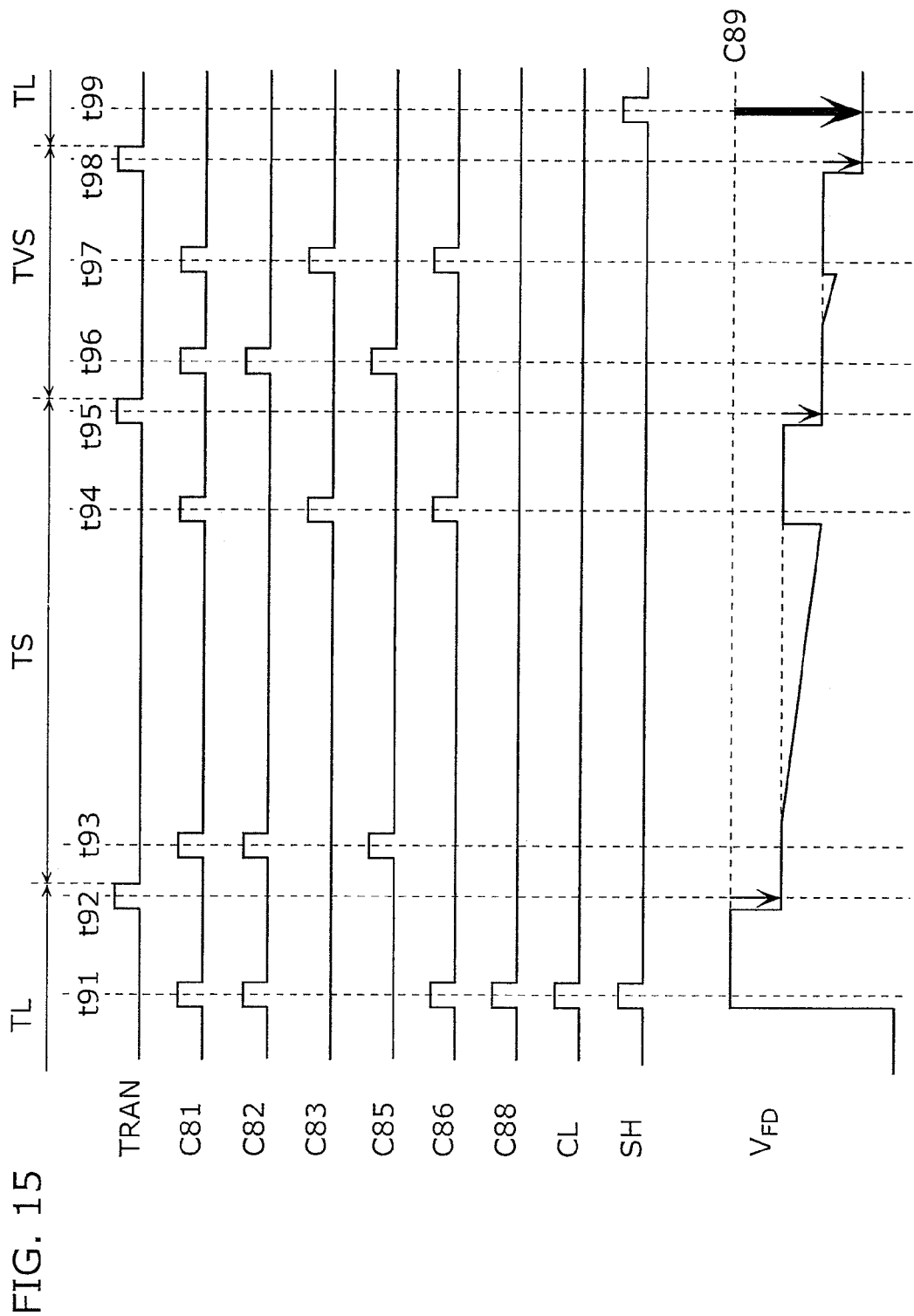
FIG. 15 illustrates a drive timing chart of the solid-state imaging device of the sixth variation according to the first embodiment of the present invention.

Driving operations in each circuit element are hereinafter exemplified to describe a function of the circuit structure. FIG. 15 illustrates a drive timing chart of the solid-state imaging device of the sixth variation according to the first embodiment of the present invention. Furthermore, $V_{FD}$ in FIG. 15 indicates a potential of the accumulating unit 13. Furthermore, the MOS transistor 8 is a switch for selecting a pixel row. During a time period when signal voltages are combined in a pixel and in a noise canceller, the MOS transistor 8 is turned on all the time.

First, at the time t91, the voltage level of gate terminals C81, C82, C86, C88, CL, and SH becomes high, and thus the MOS transistors 81, 82, 86, 88, 12, and 9 are turned on.

In this case, a bias voltage in the terminal C89 is applied to the accumulating unit 13, and the voltage $V_{NCDC}$ is applies to the terminal OUT that is a contact point between the capacitors 10 and 11.

Next, at the time t92, the voltage level of TRAN becomes high, and an optical signal charge generated in the photodiode 1 during the period TL is transferred to the accumulating unit 13 through the MOS transistor 2.

Since the generated charge has a negative characteristic, a potential of the accumulating unit 13 is lower than that of C89.

Next, at the time t93, the voltage level of the gate terminals C81, C82, and C85 becomes high, and thus the MOS transistors 81, 82, and 85 are turned on.

In this case, a voltage value of the accumulating unit 13 is stored in the capacitor 87 through the buffer circuit 84. During the period TS that is a period of 300 μsec equal to ¹/₁₀₀ of the TL period that is a normal exposure time (approximately 30 msec), for example, a crystal defect or a dark current causes generation of a negative charge in the accumulating unit 13 as described above, thus further reducing the potential from the time t93 according to the passage of time.

Next, at the time t94, the voltage level of the gate terminals C81, C83, and C86 becomes high, and thus the MOS transistors 81, 83, and 86 are turned on.

In this case, a voltage value of the capacitor 87 is set in the accumulating unit 13 through the buffer circuit 84. In other words, the accumulating unit 13 is not influenced by voltage variations caused by white defects due to setting of a voltage at the time t93.

Operations from the time t95 to t97 are performed in the same manner as from the time t92 to t94, and the voltage level of TRAN becomes high at the time t98 to turn on the MOS transistor 2. These operations correspond to transferring of an optical signal charge generated in the photodiode 1 during the periods TL, TS, and TVS sequentially. In other words, respective signals generated during the periods TL, TS, and TVS are combined in the accumulating unit 13.

Finally, at the time t99, a voltage level of SH becomes high, and thus the MOS transistor 9 is turned on.

In this case, a changed amount of the voltage in the accumulating unit 13 is transmitted to the terminal OUT through the MOS transistors 4 and 7 that function as a source follower. The changed amount may be determined by an equation, {a changed amount of voltage in the accumulating unit 13×a gain in the source follower×(a proportion of a capacitance in the capacitor 10 and a capacitance in the capacitor 11)}.

Thus, a difference between a voltage in the terminal OUT and $V_{NCDC}$ at the time t99 is set as a value of combined voltage signals generated during the periods TL, TS, and TVS.

Comparing FIG. 14A illustrating the circuit structure of the solid-state imaging device of the sixth variation according to the first embodiment to the structure of the basic circuit in FIG. 3, the MOS transistors 81, 82, 86, and 88 correspond to the reset unit in FIG. 3, the MOS transistors 81, 82, and 85, the buffer circuit 84, and the capacitor 87 correspond to the storing unit in FIG. 3, and the MOS transistors 81, 83, and 86, and the buffer circuit 84 correspond to the voltage setting unit in FIG. 3.

Figure 16:
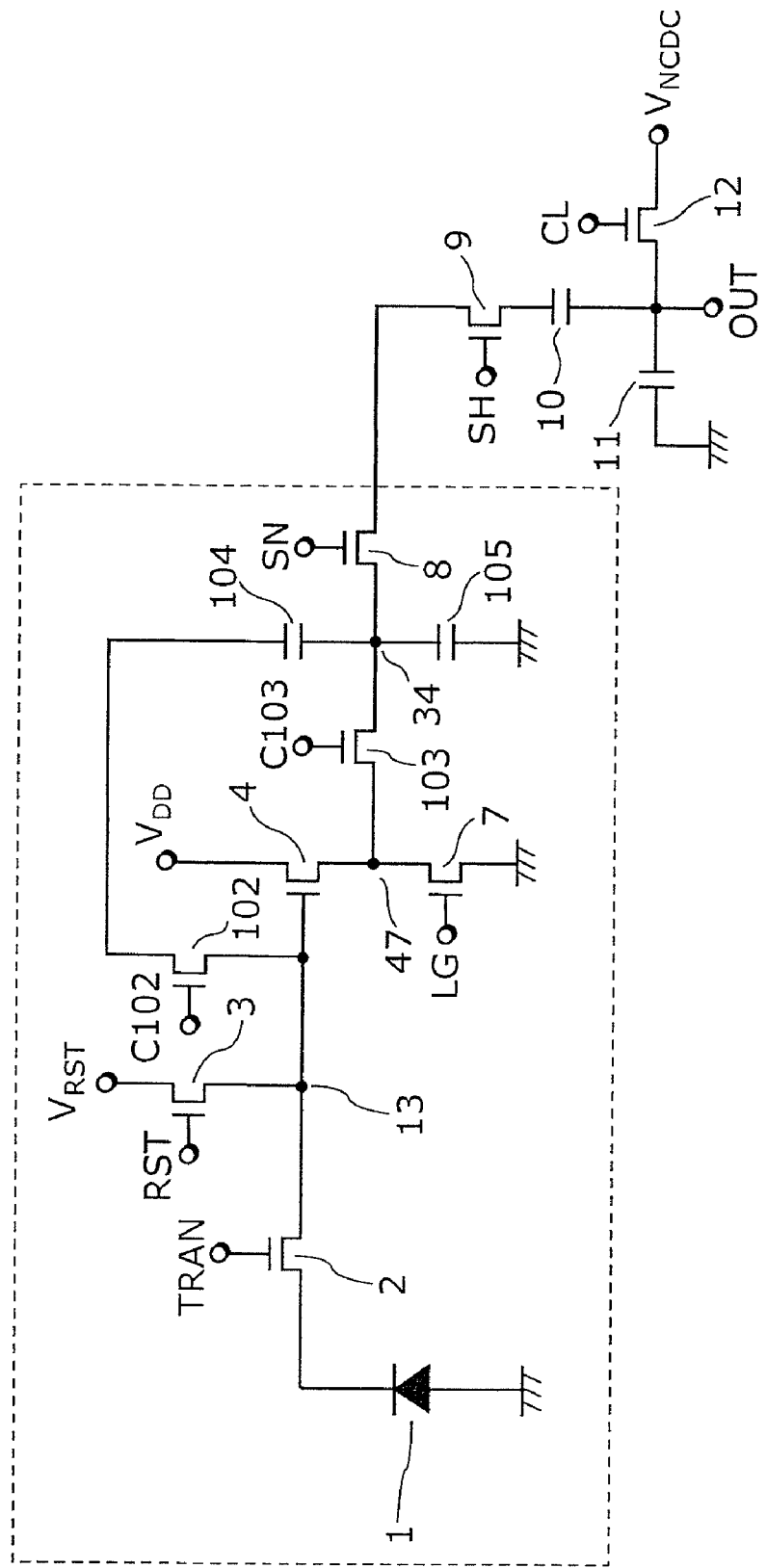
FIG. 16 illustrates a configuration of the solid-state imaging device of the seventh variation according to the first embodiment of the present invention.

FIG. 16 illustrates a structure of a solid-state imaging device of a seventh variation according to the first embodiment of the present invention. The solid-state imaging device in FIG. 16 includes the photodiode 1, the MOS transistors 2, 3, 4, 7, 8, 9, and 12, MOS transistors 102 and 103, the capacitors 10 and 11, capacitors 104 and 105, the accumulating unit 13, a pixel output point 34, and the source follower output point 47.

FIG. 16 has a circuit structure including a reset unit that is provided independently as in FIG. 3, but differs from FIG. 3 in that each circuit element shares functions of a storing unit and a voltage setting unit. Circuit elements in FIG. 16 that are different from those of FIG. 3 are hereinafter described in details except for the common elements described for FIG. 3.

Capacitors 104 and 105 are connected at a pixel output point 34. A pixel includes a portion enclosed by a dashed line in FIG. 16.

Figure 17:
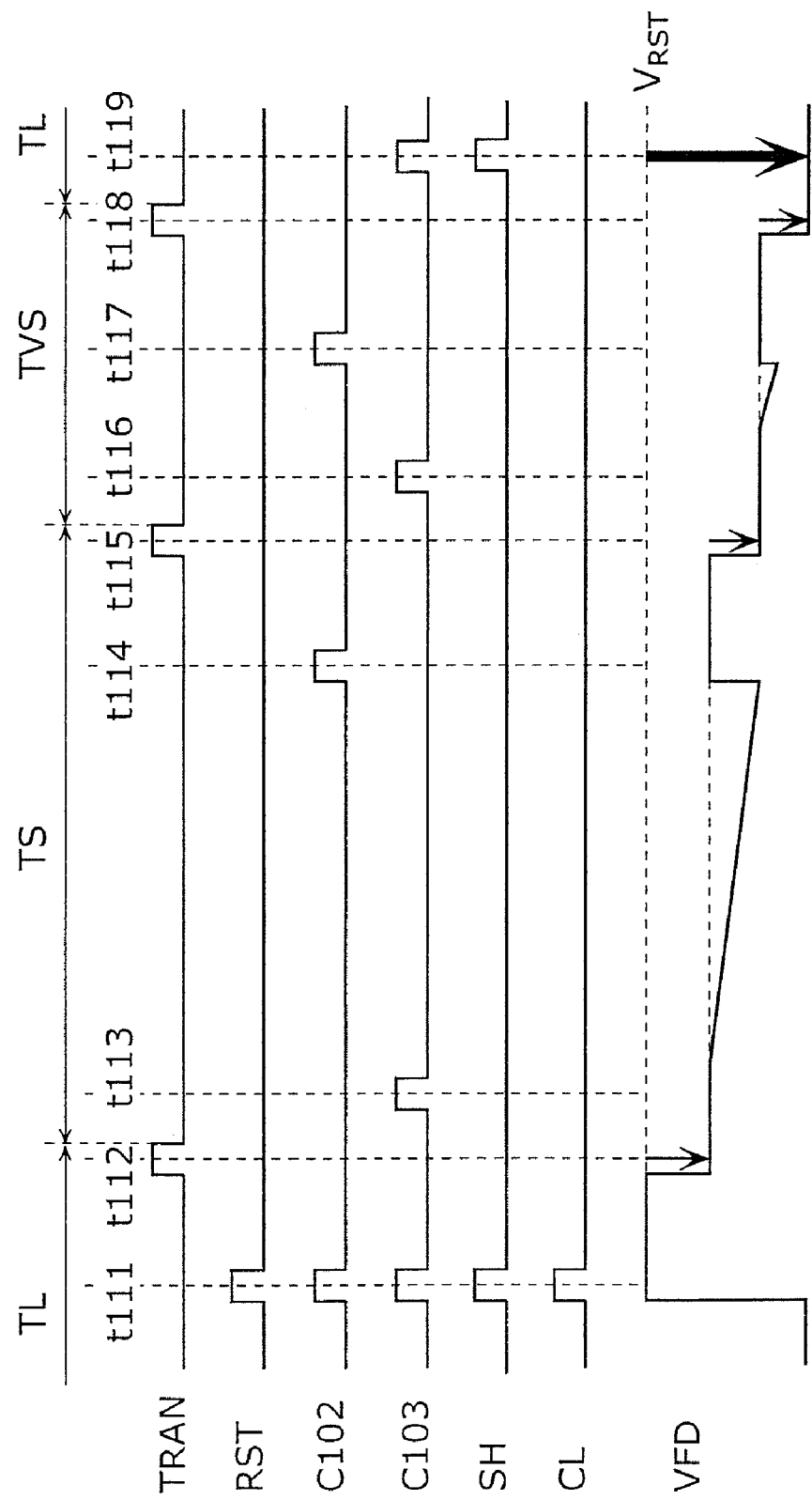
FIG. 17 illustrates a timing chart of the solid-state imaging device of the seventh variation according to the first embodiment of the present invention.

Driving operations of each circuit element are hereinafter exemplified to describe a function of the circuit structure. FIG. 17 illustrates a timing chart of the solid-state imaging device of the seventh variation according to the first embodiment of the present invention. Furthermore, $V_{FD}$ in FIG. 17 indicates a potential of the accumulating unit 13. Furthermore, the MOS transistor 8 is a switch for selecting a pixel row. During a time period when signal voltages are combined in the pixel and in the noise canceller, the MOS transistor 8 is turned on all the time.

First, at the time t111, the voltage level of RST, C102, C103, SH, and CL becomes high, and the MOS transistors 3, 9, 12, 102, and 103 are turned on.

In this case, a voltage $V_{RST}$ is applies to the accumulating unit 13, and a voltage $V_{NCDC}$ is applies to the terminal OUT that is a contact point between the capacitors 10 and 11.

When a difference between a gate terminal of the MOS transistor 4 and the source follower output point 47 is defined as a voltage difference V4, the voltage $V_{RST}$ is applied to a contact point between a capacitor 104 and the MOS transistor 102, a voltage value ($V_{RST}$–V4) is applied to the pixel output point 34, and the V4 is stored in the capacitor 104. The voltage value ($V_{RST}$–V4) is also applied to the capacitor 105.

Next, at the time t112, the voltage level of TRAN becomes high, and the optical signal charge generated in the photodiode 1 during the period TL is transferred to the accumulating unit 13 through the MOS transistor 2. Since the generated charge has a negative characteristic, a potential of the accumulating unit 13 is lower than that of $V_{RST}$. When a drop amount of the voltage is defined as $V_{TL}$, the voltage in the accumulating unit 13 is defined as a voltage value ($V_{RST}$–$V_{TL}$).

Next, at the time t113, the voltage level of C103 becomes high, and the MOS transistor 103 is turned on. In this case, a voltage value ($V_{RST}$–$V_{TL}$–V4) is stored in the capacitor 105 through the MOS transistor 103. Since the capacitor 104 stores the voltage value V4, a voltage value of the contact point between the capacitor 104 and the MOS transistor 102 is defined as {($V_{RST}$–$V_{TL}$–V4)+V4} that is the same as the voltage value ($V_{RST}$–$V_{TL}$) in the accumulating unit 13.

As described above, white defects occur during the period TS, and the voltage in the accumulating unit 13 drops according to the passage of time. Thus, until the next accumulation of an optical signal charge, the potential of the accumulating unit 13 needs to be set to a voltage in the accumulating unit 13 at the time t113.

Next, at the time t114, the voltage level of C102 becomes high, and the MOS transistor 102 conducts electricity. Thus, the voltage stored in the capacitor 104 is transmitted to the accumulating unit 13, and the voltage in the accumulating unit 13 is set to a voltage value ($V_{RST}$–$V_{TL}$) at the time t113.

The operations from the time t115 to t117 are performed in the same manner as from the time t112 to t114, and the voltage level of TRAN becomes high at the time t118 to turn on the MOS transistor 2. These operations correspond to transferring of an optical signal charge generated in the photodiode 1 during the periods TL, TS, and TVS sequentially to the accumulating unit 13. In other words, respective signals generated during the periods TL, TS, and TVS are combined in the accumulating unit 13.

Finally, at the time t119, the voltage level of SH and C103 becomes high, and thus the MOS transistors 9 and 103 are turned on.

In this case, a changed amount of the voltage in the accumulating unit 13 is transmitted to the terminal OUT through the MOS transistors 4 and 7 that function as a source follower. The changed amount may be determined by {a changed amount of voltage in the accumulating unit 13×a gain of source follower×(a proportion of a capacitance in the capacitor 10 and a capacitance in the capacitor 11)}.

Thus, a difference between a voltage in the terminal OUT and $V_{NCDC}$ at the time t119 is set as a value of combined voltage signals during the periods TL, TS, and TVS.

Comparing FIG. 16 illustrating the circuit structure of the solid-state imaging device of the seventh variation according to the first embodiment to the structure of the basic circuit in FIG. 3, the MOS transistor 3 corresponds to the reset unit in FIG. 3, the MOS transistors 103, 104, and 105 correspond to the storing unit in FIG. 3, and the MOS transistor 102 corresponds to the voltage setting unit in FIG. 3.

As described above, the solid-state imaging device according to the first embodiment includes in a pixel: a charge combining unit that combines signal voltages each corresponding to optical signal charges of light generated in light-receiving elements; a storing unit that stores the voltage combined by the charge combining unit; and a voltage setting unit that sets, in the charge combining unit, a value corresponding to the voltage in the storing unit. According to the first embodiment, voltages corresponding to respective optical signal charges generated in a plurality of exposure times are added in a pixel for a short period of time without any influence of voltage variations according to the passage of time in the charge combining unit. Thus, a dynamic range may be expanded without any external circuit.

Note that the driving method of the solid-state imaging device described in the third variation of the first embodiment is not only achieved by a solid-state imaging apparatus including the solid-state imaging device illustrated in FIG. 5 but also by the basic circuit illustrated in FIG. 3 and by a solid-state imaging apparatus including the solid-state imaging device illustrated in FIGS. 4, 6, 14, and 16.

FIG. 18A illustrates a functional block diagram of a solid-state imaging apparatus including the solid-state imaging device according to the first embodiment of the present invention, and FIG. 18B illustrates a functional block diagram of a conventional solid-state imaging apparatus. The solid-state imaging apparatus illustrated in FIG. 18A combines, in pixel units of a solid-state imaging device 71, signals generated during a period TL and a period TS, and further a signal generated during a period TVS. Thus, without any external circuit, an output signal generated in the pixel units of the solid-state imaging device 71 is regarded as a combined image.

In contrast, the conventional solid-state imaging apparatus illustrated in FIG. 18B stores signals, sig 1, sig 2, and sig 3 generated in a solid-state imaging device 72 respectively during periods TL, TS, and TVS, in a circuit 73 outside the solid-state imaging device. Then, a combining unit in the circuit 73 combines the signals to generate a combined image.

Since the solid-state imaging device according to the first embodiment does not need a storing unit and an image combining unit outside the solid-state imaging device, even when a specification and design of a dynamic range need to be changed, the solid-state imaging device has such an advantage that a pixel unit in a solid-state imaging device has only to be changed without any considerable influence on an external system.

Conventional MOS sensors perform a rolling shutter operation where light is sequentially exposed to rows, and respective signals are outputted from the sensors. Thus, when a person who takes an image is moving to shoot a stationary subject, or when a motionless person shoots a moving subject, an image to be taken is distorted. In contrast, since the first embodiment achieves a global shutter operation that a screen image is exposed to light at once, the screen image is never distorted. The solid-state imaging device that achieves such a global shutter operation is significantly advantageous for a vehicle-mounted camera and a machine vision that are used for shooting a subject by a person who is moving or for shooting a moving subject. As such, the present invention is very advantageous not only for expanding a dynamic range by combining signal charges (in other words, multiple exposure) that have been accumulated during a plurality of exposure times, but also for enabling a global shutter operation even when a charge accumulated during a single exposure time is outputted, for example. Thus, the present invention also covers capturing of an image through one-time light exposure.

Second Embodiment

A solid-state imaging device according to the second embodiment includes in a pixel: an accumulating unit that accumulates an optical signal charge generated in a light-receiving element; a reset unit that resets a voltage in the accumulating unit; a difference circuit unit that adds a difference voltage between a signal voltage in the accumulating unit and a voltage reset in the reset unit; a storing unit that stores a signal voltage in the difference circuit unit; and a voltage setting unit that sets, in the difference circuit unit, a voltage in the storing unit.

According to the second embodiment, voltages corresponding to respective optical signal charges generated in a plurality of exposure times can be added in a pixel for a short period of time. Thereby, without an external circuit, a dynamic range can be expanded.

With reference to drawings, the solid-state imaging device according to the second embodiment of the present invention is hereinafter described.

Figure 19:
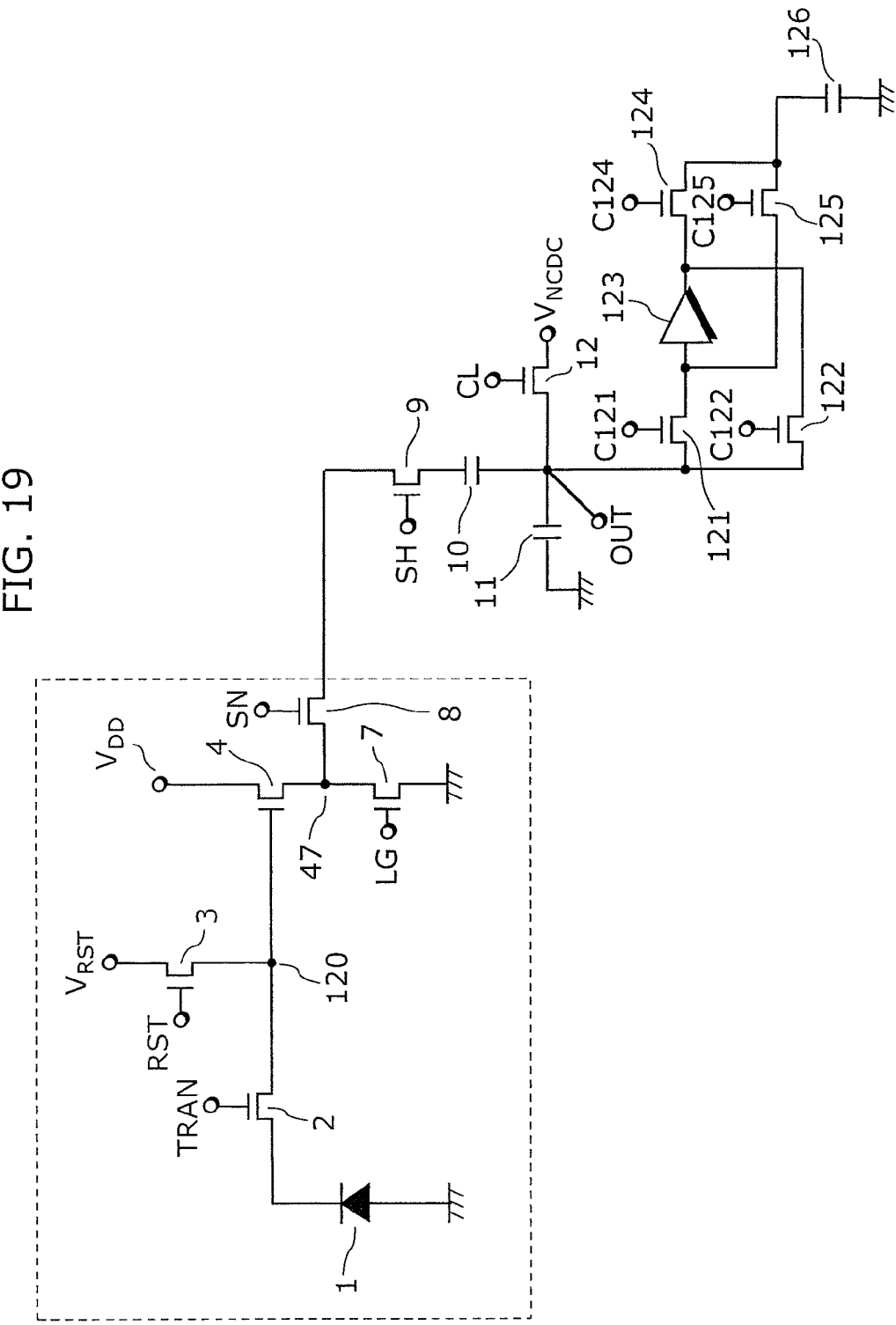
FIG. 19 illustrates a configuration of a circuit of the solid-state imaging device according to the second embodiment of the present invention.

FIG. 19 illustrates a structure of a circuit of the solid-state imaging device according to the second embodiment of the present invention. The solid-state imaging device in FIG. 19 includes a photodiode 1, MOS transistors 2, 3, 4, 7, 8, 9, 121, 122, 124, and 125, capacitors 10, 11, and 126, a source follower output point 47, an accumulating unit 120, and a buffer circuit 123. FIG. 19 differs from FIG. 10 in a structure in that the MOS transistors 121, 122, 124, and 125 that are circuit elements that functions as a storing unit and a voltage setting unit, the capacitor 126, and the buffer circuit 123 are provided for each column signal line.

The photodiode 1 is a light-receiving element that generates an optical signal charge according to an intensity of light entering the light-receiving element. The MOS transistor 2 is included in a transferring unit, and has a function of transferring an optical signal charge generated in the photodiode 1 to the accumulating unit 120.

The MOS transistor 3 is included in the reset unit, and has a function of resetting a voltage in the accumulating unit 120.

The MOS transistors 9 and 12, and the capacitors 10 and 11 are included in the difference circuit unit, and have a function of combining a difference voltage between a signal voltage and a reset voltage in the accumulating unit 120, and a reference voltage set by the voltage setting unit. Here, an initial value of the reference voltage is $V_{NCDC}$.

The MOS transistors 121 and 124, the buffer circuit 123, and the capacitor 126 are included in the storing unit, and have a function of storing a voltage obtained by combining voltages in the difference circuit unit.

The MOS transistors 122 and 125, and the buffer circuit 123 are included in the voltage setting unit, and have a function of setting a voltage held in the storing unit as a reference voltage in the difference circuit.

The MOS transistors 4 and 7 are included in a circuit unit, and have a function of reading a voltage in the accumulating unit 120.

In the second embodiment, each of the accumulating unit 120, the reset unit, and the difference circuit unit has a distinctive function, and they compose one charge combining unit that has a function of combining voltages corresponding to optical signal charges.

A gain in the buffer circuit 123 is 1. Here, the buffer circuit 123 is made up of, for example, a buffer circuit 80 including an inverting circuit having two inverter circuits illustrated in FIG. 14B or an operational amplifier.

A pixel includes a portion enclosed by a dashed line in FIG. 19. The driving operations of each circuit element are hereinafter exemplified to describe a function of the circuit structure.

Figure 20:
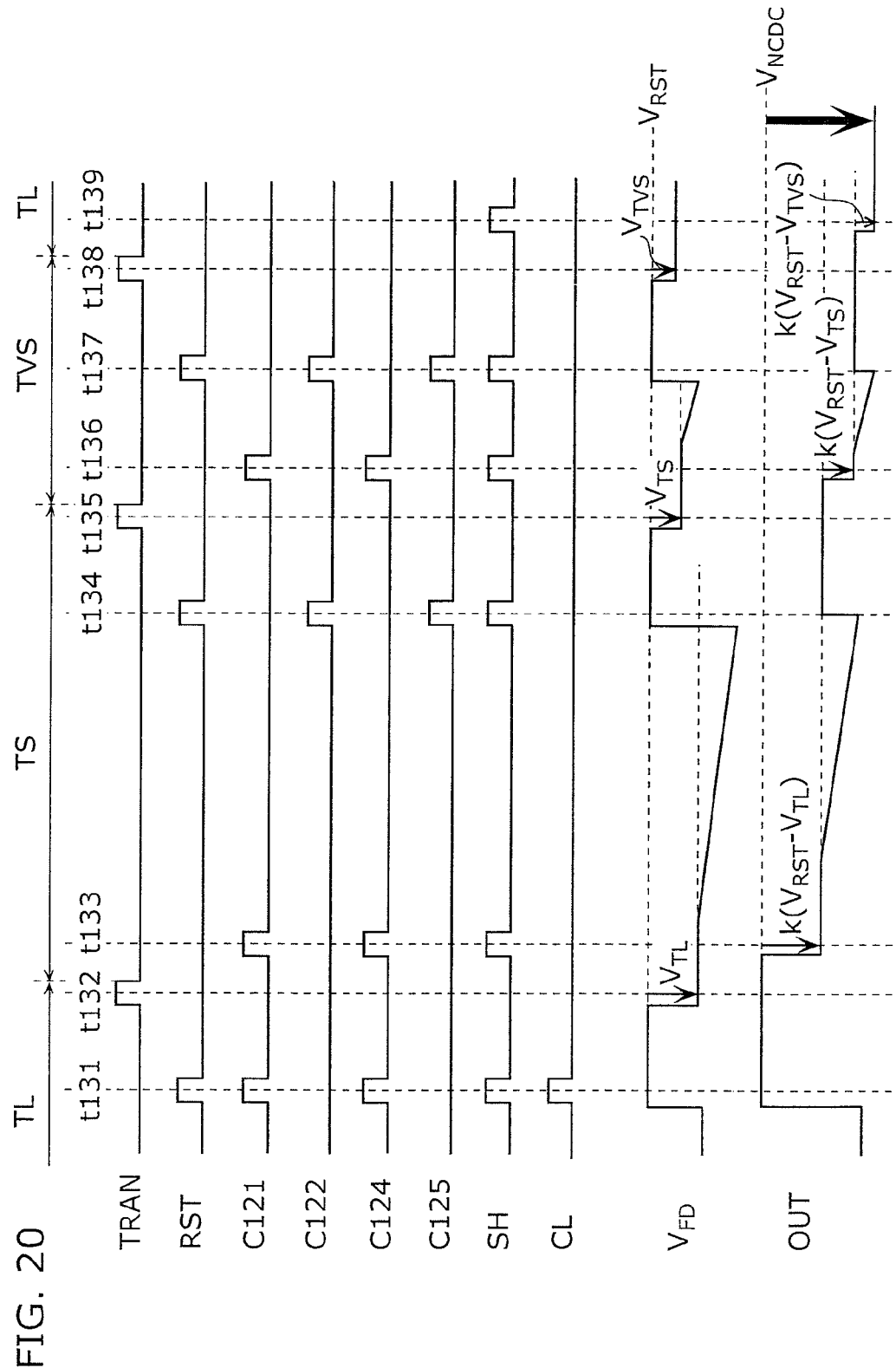
FIG. 20 illustrates a timing chart of the solid-state imaging device of the second embodiment of the present invention.

FIG. 20 illustrates a timing chart of the solid-state imaging device of the second embodiment of the present invention. Furthermore, $V_{FD}$ in FIG. 20 indicates a potential of the accumulating unit 120. Furthermore, the MOS transistor 8 is a switch for selecting a pixel row.

First, at the time t131, the voltage level of RST, C121, C124, SH, and CL becomes high, and the MOS transistors 3, 121, 124, 9, and 12 are turned on. The voltage $V_{RST}$ is applies to the accumulating unit 120, and the voltage $V_{NCDC}$ is applies to a terminal OUT. Furthermore, $V_{NCDC}$ is stored in a capacitor 126 through the MOS transistors 121 and 124, and the buffer circuit 123.

Next, at the time t132, the voltage level of TRAN becomes high, and the signal charge generated in the photodiode 1 during the period TL is transferred to the accumulating unit 120 through the MOS transistor 2. Since the generated charge has a negative characteristic, a potential of the accumulating unit 120 is lower than that of $V_{RST}$. When a drop amount of the voltage is defined as $V_{TL}$, the voltage of the accumulating unit 120 is defined as a voltage ($V_{RST}-V_{TL}$).

Next, at the time t133, the voltage level of C121, C124, and SH becomes high, and the MOS transistors 121, 124, and 9 are turned on. In this case, an amount of the voltage varied from $V_{NCDC}$ is defined as $\{k \times (-V_{TL})\}$ that is an amount of a voltage corresponding to an output signal of light received by the photodiode 1 during the period TL. Here, k is determined using an equation, {a gain in a source follower×(a proportion of a capacitance in the capacitor 10 and a capacitance in the capacitor 11)}. The capacitor 126 stores a voltage value $[V_{NCDC}-\{k \times (V_{RST}-V_{TL})\}]$ At the time t134, the voltage level of RST, C122, C125, and SH becomes high, and the MOS transistors 3, 122, 125, and 9 are turned on. The voltage in the accumulating unit 120 is set again to $V_{RST}$ that is a reset voltage. However, the voltage in the terminal OUT is set to a voltage value $[V_{NCDC}-\{k \times (V_{RST}-V_{TL})\}]$ that is held in the capacitor 126. In other words, although initially, the voltage in the terminal OUT is set to $V_{NCDC}$ at the time t131, it is set to a voltage value including a voltage corresponding to the signal outputted during the period TL. Thereby, signals outputted during respective time periods are added by setting of different voltage values for each of the time periods.

The operations from the time t135 to t137 are performed in the same manner as from the time t132 to t134, and the voltage level of TRAN becomes high at the time t138 to turn on the MOS transistor 2. Then, an optical signal charge generated in the photodiode 1 during the period TVS is transferred to the accumulating unit 120.

Finally, at the time t139, a voltage level of SH becomes high, and thus the MOS transistor 9 conducts electricity. Thereby, an amount of voltage changed according to the combined signals during the periods TL, TS, and TVS is outputted to the terminal OUT.

Here, in the circuit structure of the solid-state imaging device according to the second embodiment, a difference circuit unit, mainly serving as a charge combining unit that combines signal voltage generated during the periods TL, TS, and TVS, is not provided for each pixel.

Since the difference circuit unit, the storing unit, and the voltage setting unit are provided for each column signal line, not for each pixel, the number of circuit elements and an area for the solid-state imaging device can be reduced.

Hereinafter, an operation for reading an output voltage when a charge combining unit is provided for each column signal line is described.

For example, as frequent cases where a preferable dynamic range may be obtained, the periods TL, TS, and TVS are set to 30 msec, 300 μsec, and 3 μsec, respectively.

Under this condition, reading one row by a column signal line takes 60 μsec that is defined as a time H.

Here, initially, light is exposed for 30 msec that is the longest exposure time during the period TL. Thereby, the exposure operation during the period TL may be performed simultaneously when voltages are outputted in other pixel rows. Thus, the exposure operation during the period TL does not influence the time H.

Furthermore, the shortest exposure time of 3 μsec that is negligible to the time H does neither influence the time H.

At the end of the period TL, a signal voltage generated during the period TL is read by the difference circuit unit. Thus, processing capacity of the difference circuit unit is occupied by the processing of the pixel unit. However, during the period TS having an exposure time 300 μsec, since no data is held for selecting a pixel row, a row to be read is changed in 60 μsec.

For example, in a circuit configuration illustrated in FIG. 19, the capacitor 126 is made up of five sub-capacitors that are connected in parallel, not a single sub-capacitor, and a switch can switch between the respective sub-capacitors.

When the switch switches between the five capacitors 126 for each 60 μsec and a light is received in each pixel row by 60 μsec, a signal voltage in the first pixel row is stored in the first sub-capacitor, and a signal voltage in the second pixel row is stored in the second sub-capacitor. In the same manner, when signal voltages in the third, fourth, and fifth pixel rows are stored in respective sub-capacitors, the total 300 μsec has passed since the first pixel row is stored in the first sub-capacitor, and signal voltages generated after light exposure of 300 μsec and 3 μsec are combined and read from the first sub-capacitor. Immediately after that, a signal voltage generated in the sixth pixel row starts to be read by the first sub-capacitor.

Through these operations, a smooth rolling shutter operation can be achieved. Accordingly, the solid-state imaging device according to the second embodiment includes in a pixel: an accumulating unit that accumulates an optical signal charge generated by a light-receiving element; a reset unit that resets a voltage in the accumulating unit; a difference circuit unit that adds a difference voltage between a signal voltage in the accumulating unit and a voltage reset in the reset unit; a storing unit that stores a signal voltage in the difference circuit unit; and a voltage setting unit that sets, in the difference circuit unit, the signal voltage in the storing unit. Thus, for example, voltages corresponding to respective optical signal charges generated in a plurality of exposure times can be added in a pixel for a short period of time. Thereby, without an external circuit, the dynamic range of the solid-state imaging device can be expanded.

The solid-state imaging device of the second embodiment in the present invention may also be compared with a conventional solid-state imaging device, as illustrated in FIG. 18 for the first embodiment. Since the solid-state imaging device according to the second embodiment does not need a storing unit and an image combining unit outside the solid-state imaging device, even when a specification and design of a dynamic range need to be changed, the solid-state imaging device has such an advantage that a pixel unit in a solid-state imaging device has only to be changed without any considerable influence on an external system.

Functions of the solid-state imaging device according to the second embodiment can be exercised by connecting the MOS transistors 21, 23, and 24 each including a storing unit and a voltage setting unit, and the capacitor 32 including a bias voltage terminal to the terminal OUT in the circuit structure of the solid-state imaging device of the first variation according to the first embodiment of the present invention that is illustrated in FIG. 5. Thus, the number of circuit elements to be needed may be reduced by arranging a simple circuit having a bias function for each column signal line, not for each pixel.

Figure 21:
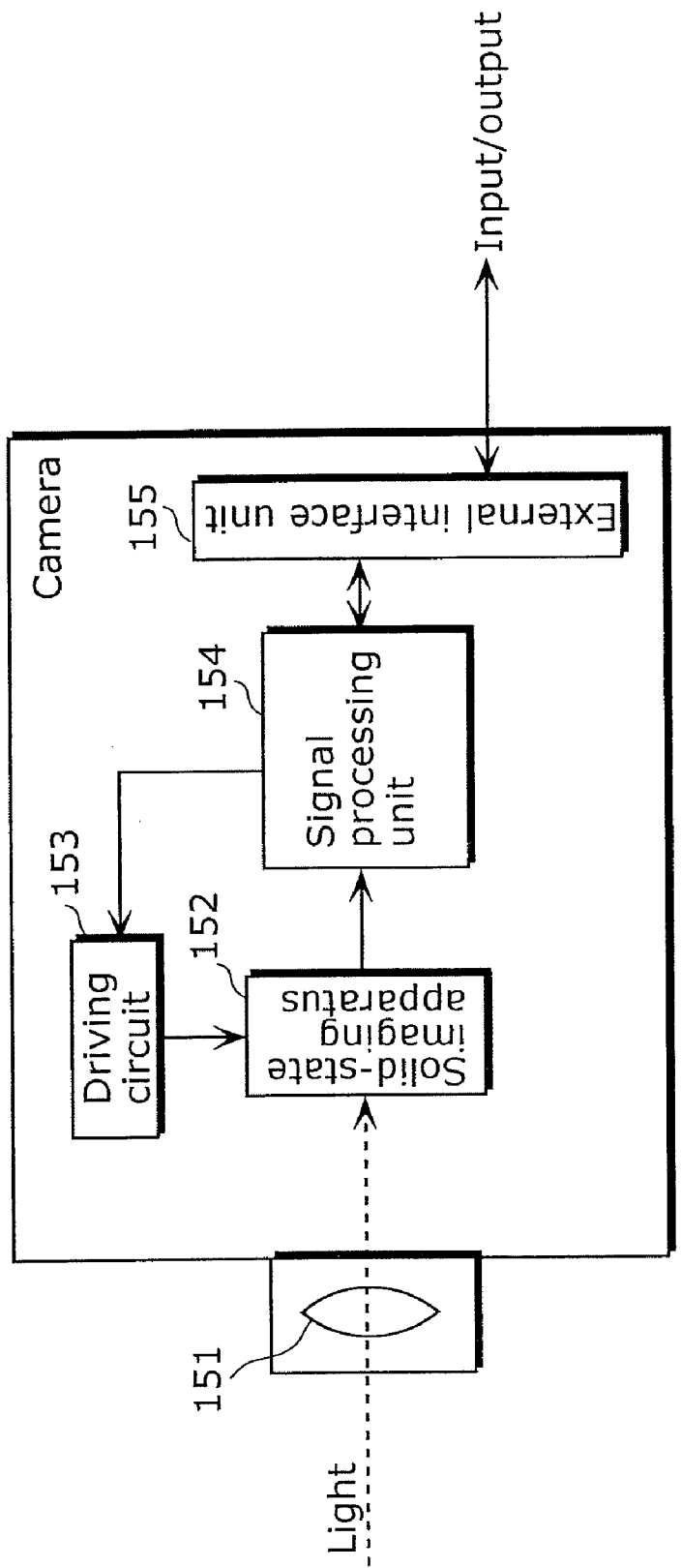
FIG. 21 illustrates a block diagram of a configuration of a camera including a solid-state imaging apparatus according to the present invention.
Figure 22A:
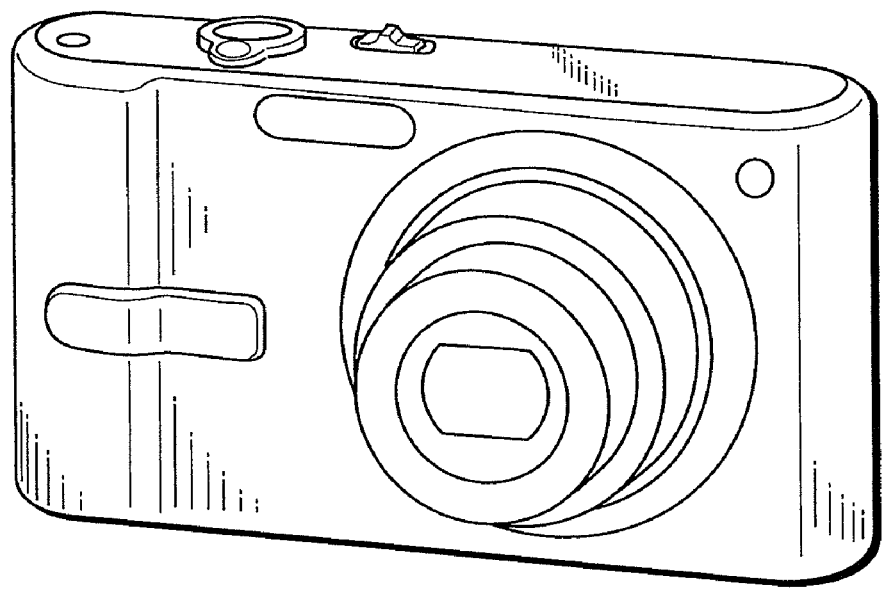
FIG. 22A illustrates an external view of a digital still camera including a solid-state imaging apparatus according to the present invention.
Figure 22B:
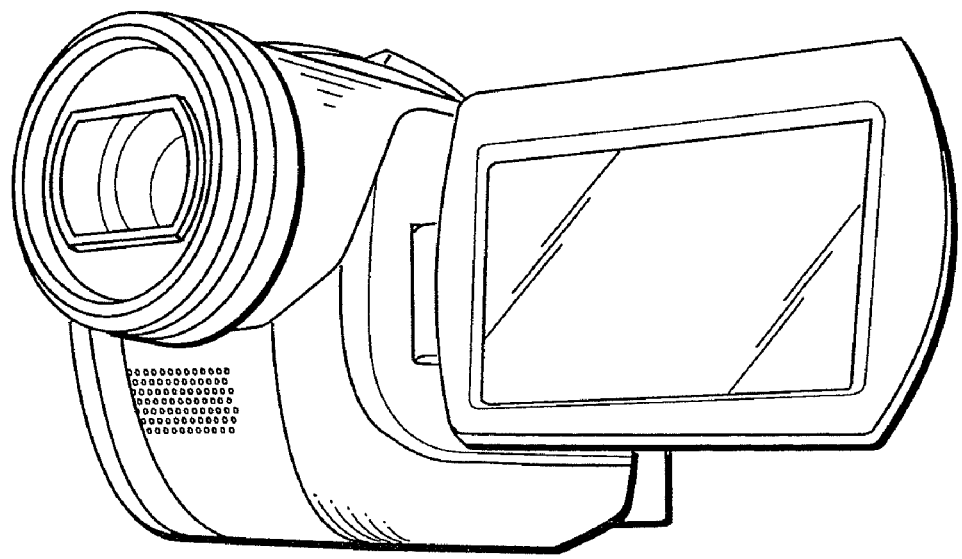
FIG. 22B illustrates an external view of a video camera including a solid-state imaging apparatus according to the present invention.

Furthermore, for example, as illustrated in FIG. 21, the present invention includes a camera including a solid-state imaging apparatus 152 according to the present invention. This camera includes a lens 151, a solid-state imaging apparatus 152, a driving circuit 153, a signal processing unit 154, and an external interface unit 155 as illustrated in FIG. 21. Light passes through the lens 151 and enters the solid-state imaging apparatus 152. The signal processing unit 154 drives the solid-state imaging apparatus 152 through the driving circuit 153 to obtain an output signal from the solid-state imaging apparatus 152. The signal processing unit 154 performs various signal processing on the output signal, and outputs the signal outside through the external interface unit 155. Here, the driving circuit 153 is characterized in driving the solid-state imaging apparatus 152 so that pixel units included in the solid-state imaging apparatus 152 and a signal outputted from a noise canceller have a wider dynamic range without any external circuit by setting different exposure times therein. Even when strong light or very weak light enters, such camera has an advantage of capturing a clear image, and is exemplified, for example, by a digital still camera illustrated in FIG. 22A and a video camera illustrated in FIG. 22B.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of this invention.

INDUSTRIAL APPLICABILITY

The present invention is in particular applicable to a digital still camera and a video camera that include a solid-state imaging device, and optimally to a solid-state imaging apparatus requiring a wider dynamic range.

What is claimed is:

1. A solid-state imaging device having pixel units that are two-dimensionally arranged, said device comprising:
   a light-receiving element that generates an optical signal charge corresponding to an intensity and an exposure time of light entering said light-receiving element;
   a transferring unit configured to transfer the optical signal charge;
   a charge combining unit configured to generate a signal voltage corresponding to the optical signal charge;
   a storing unit configured to store a signal voltage corresponding to the optical signal charge in said charge combining unit; and
   a voltage setting unit configured to set a value of a voltage in said charge combining unit to a value corresponding to the signal voltage stored by said storing unit.

2. The solid-state imaging device according to claim 1, wherein each of the pixel units includes said light-receiving element, said transferring unit, said charge combining unit, said storing unit, and said voltage setting unit.

3. The solid-state imaging device according to claim 1, wherein said charge combining unit includes:
   an accumulating unit configured to accumulate the optical signal charge;
   a reset unit configured to reset a voltage in said accumulating unit; and
   a difference circuit unit configured to output a voltage obtained by combining, with a predetermined reference voltage, a difference voltage between a voltage obtained by resetting the voltage in said accumulating unit and the signal voltage corresponding to the optical signal charge accumulated by said accumulating unit, and
   said voltage setting unit is configured to set the signal voltage stored by said storing unit as the reference voltage of said difference circuit unit.

4. The solid-state imaging device according to claim 3, wherein each of the pixel units includes said light-receiving element, said transferring unit, said accumulating unit, and said reset unit, and
   said difference circuit unit, said storing unit, and said voltage setting unit are formed for each column signal line connected to a portion of the pixel units that are arranged in an identical column.

5. The solid-state imaging device according to claim 3, wherein said storing unit includes: a first capacitor connected, through a switch, between an output terminal in said difference circuit unit and said charge combining unit; and a second capacitor connected between the output terminal and a ground, and
   said voltage setting unit is configured to set, in said charge combining unit, a voltage held in the first capacitor.

6. The solid-state imaging device according to claim 1, wherein said voltage setting unit includes one of:
   a transistor including a gate terminal connected to said storing unit, a drain terminal connected to a power supply unit, and a source terminal connected to said charge combining unit through a switch; and a transistor including a gate terminal connected to said storing unit, a source terminal connected to a power supply unit, and a drain terminal connected to said charge combining unit through a switch.

7. The solid-state imaging device according to claim 1, wherein said voltage setting unit includes an output terminal that is connected to a column signal line common to a portion of the pixel units arranged in a column direction, said output terminal outputting the value corresponding to the signal voltage stored by said storing unit as a pixel signal.

8. The solid-state imaging device according to claim 7, further comprising:
a reset voltage applying circuit,
wherein said reset voltage applying circuit is connected to an end of the column signal line, and applies a reset voltage to said charge combining unit and said storing unit through said output terminal.

9. The solid-state imaging device according to claim 1, wherein said voltage setting unit includes a buffer circuit that inputs a voltage outputted from said storing unit.

10. The solid-state imaging device according to claim 1, wherein said storing unit includes a third capacitor having one terminal connected to said charge combining unit through a switch, and having another terminal connected to a bias circuit.

11. A solid-state imaging apparatus, comprising:
a solid-state imaging device, including:
a light-receiving element that generates an optical signal charge corresponding to an intensity and an exposure time of light entering said light-receiving element;
a transferring unit configured to transfer the optical signal charge;
a charge combining unit configured to generate a signal voltage corresponding to the optical signal charge;
a storing unit configured to store a signal voltage corresponding to the optical signal charge in said charge combining unit;
a voltage setting unit configured to set a value of a voltage in said charge combining unit to a value corresponding to the signal voltage stored by said storing unit; and
a driving unit configured to store a first signal voltage corresponding to an optical signal charge generated during a first exposure time through said transferring unit, said charge combining unit, and said storing unit, and to set the first signal voltage in said charge combining unit through said voltage setting unit,
wherein said charge combining unit is configured to combine the optical signal charge corresponding to the set first signal voltage and an optical signal charge generated during a second exposure time, through said transferring unit, and to set, in said charge combining unit, a voltage corresponding to the combined optical signal charges as the first signal voltage.

12. A camera, comprising a solid-state imaging apparatus including a solid-state imaging device, including:
a light-receiving element that generates an optical signal charge corresponding to an intensity and an exposure time of light entering said light-receiving element;
a transferring unit configured to transfer the optical signal charge;
a charge combining unit configured to generate a signal voltage corresponding to the optical signal charge;
a storing unit configured to store a signal voltage corresponding to the optical signal charge in said charge combining unit;
a voltage setting unit configured to set a value of a voltage in said charge combining unit to a value corresponding to the signal voltage stored by said storing unit; and
a driving unit configured to store a first signal voltage corresponding to an optical signal charge generated during a first exposure time through said transferring unit, said charge combining unit, and said storing unit, and to set the first signal voltage in said charge combining unit through said voltage setting unit,
wherein said charge combining unit is configured to combine the optical signal charge corresponding to the set first signal voltage and an optical signal charge generated during a second exposure time, through said transferring unit, and to set, in said charge combining unit, a voltage corresponding to the combined optical signal charges as the first signal voltage.

13. A driving method of a solid-state imaging device having pixel units that are two-dimensionally arranged, said method comprising:
transferring a first optical signal charge to a charge combining unit, the first optical signal charge being generated during a first exposure time by a light-receiving element included in each of the pixel units;
storing a voltage corresponding to the first optical signal charge in said transferring, the first optical signal charge being generated by the charge combining unit;
setting, in the charge combining unit, the voltage corresponding to the first optical signal charge stored in said storing;
transferring a second optical signal charge generated during a second exposure time by a light-receiving element to the charge combining unit after said setting; and
reading, as a pixel signal, a voltage obtained by combining the second optical signal charge transferred in said transferring and the first optical signal charge set in said setting.

14. The driving method according to claim 13, wherein the voltage corresponding to the first optical signal charge is stored in a capacitor in said storing, the capacitor having one terminal connected to the charge combining unit and having another terminal connected to a bias circuit, and
a bias voltage to be applied when the capacitor stores the voltage corresponding to the first optical signal charge is different from a bias voltage to be applied when the voltage that corresponds to the first signal charge and that is stored in the capacitor is set in the charge combining unit.

15. The driving method according to claim 13, wherein each of said transferring of the first optical signal charge, said storing, said setting, said transferring of the second is optical signal charge, and said reading is performed in two or more of the pixel units almost simultaneously.

* * * * *